US008081811B2

(12) United States Patent
Moriya

(10) Patent No.: US 8,081,811 B2
(45) Date of Patent: Dec. 20, 2011

(54) METHOD, APPARATUS, AND PROGRAM FOR JUDGING IMAGE RECOGNITION RESULTS, AND COMPUTER READABLE MEDIUM HAVING THE PROGRAM STORED THEREIN

(75) Inventor: Yoshiyuki Moriya, Kanagawa-ken (JP)

(73) Assignee: FUJIFILM Corporation, Tokyo (JP)

( * ) Notice: Subject to any disclaimer, the term of this patent is extended or adjusted under 35 U.S.C. 154(b) by 894 days.

(21) Appl. No.: 12/101,605

(22) Filed: Apr. 11, 2008

(65) Prior Publication Data

US 2008/0260226 A1 Oct. 23, 2008

(30) Foreign Application Priority Data

Apr. 12, 2007 (JP) ................................. 2007-105199

(51) Int. Cl.
*G06K 9/00* (2006.01)
*G06K 9/64* (2006.01)
(52) U.S. Cl. ..................... 382/131; 382/218; 382/219
(58) Field of Classification Search .................. 382/131, 382/218, 219
See application file for complete search history.

(56) References Cited

U.S. PATENT DOCUMENTS

| | | | | |
|---|---|---|---|---|
| 4,618,989 A * | 10/1986 | Tsukune et al. | ............... | 382/203 |
| 4,975,969 A * | 12/1990 | Tal | ................. | 382/116 |
| 5,768,333 A * | 6/1998 | Abdel-Mottaleb | ............ | 378/37 |
| 5,790,690 A * | 8/1998 | Doi et al. | ....................... | 382/128 |
| 5,832,103 A * | 11/1998 | Giger et al. | .................... | 382/130 |
| 5,850,465 A * | 12/1998 | Shimura et al. | ............... | 382/132 |
| 6,011,862 A * | 1/2000 | Doi et al. | ........................ | 382/132 |
| 6,381,348 B2 * | 4/2002 | Takeo | ........................... | 382/128 |
| 6,738,499 B1 * | 5/2004 | Doi et al. | ....................... | 382/128 |
| 7,046,836 B2 * | 5/2006 | Shinbata | ....................... | 382/132 |
| 7,101,213 B2 | 9/2006 | Toyoda | | |
| 7,245,747 B2 | 7/2007 | Oosawa | | |
| 7,734,102 B2 * | 6/2010 | Bergeron et al. | .............. | 382/209 |
| 7,747,053 B2 * | 6/2010 | Kadomura et al. | ........... | 382/128 |
| 2005/0100195 A1 | 5/2005 | Li | | |
| 2006/0002602 A1 * | 1/2006 | Shinbata | ....................... | 382/132 |
| 2006/0004282 A1 | 1/2006 | Oosawa | | |
| 2006/0062425 A1 | 3/2006 | Shen et al. | | |

FOREIGN PATENT DOCUMENTS

| | | |
|---|---|---|
| JP | 09-187444 A | 7/1997 |
| JP | 2002-253539 A | 9/2002 |
| JP | 2003-010166 A | 1/2003 |
| JP | 2005-108195 A | 4/2005 |
| JP | 2006-006359 A | 1/2006 |
| JP | 2006-140041 A | 6/2006 |

* cited by examiner

*Primary Examiner* — Brian Werner
*Assistant Examiner* — Utpal Shah
(74) *Attorney, Agent, or Firm* — Sughrue Mion, PLLC

(57) ABSTRACT

To obtain more accurate image recognition results while alleviating the burden on the user to check the image recognition results. An image recognition unit recognizes a predetermined structure in an image representing a subject, then a recognition result judging unit measures the predetermined structure on the image recognized by the image recognition unit to obtain a predetermined anatomical measurement value of the predetermined structure, automatically judges whether or not the anatomical measurement value falls within a predetermined standard range, and, if it is outside of the range, judges the image recognition result to be incorrect.

18 Claims, 33 Drawing Sheets

FIG.7A

|  | SLICE 1 | SLICE 2 | SLICE 3 | SLICE 4 | SLICE 5 | SLICE 6 | ... |
|---|---|---|---|---|---|---|---|
| HEAD | -0.3 | -0.2 | -0.5 | -0.7 | -0.9 | -0.7 |  |
| HEAD-NECK | 2.0 | 1.2 | 0.1 | -0.5 | -0.8 | -0.5 |  |
| NECK | -0.3 | -0.1 | 1.2 | 0.6 | 1.1 | 0.5 |  |
| CHEST | -0.5 | -0.3 | -0.1 | 0.7 | 0.6 | 1.3 |  |
| ...... |  |  |  |  |  |  |  |

FIG.7B

|  | SLICE 1 | SLICE 2 | SLICE 3 | SLICE 4 | SLICE 5 | SLICE 6 | ... |
|---|---|---|---|---|---|---|---|
| HEAD | 2.3 | 1.4 | 1.7 | 2.1 | 2.0 | 2.0 |  |
| HEAD-NECK | 0 | 0 | 1.1 | 1.9 | 1.9 | 1.8 |  |
| NECK | 2.3 | 1.3 | 0 | 0.1 | 0 | 0.8 |  |
| CHEST | 2.5 | 1.5 | 1.3 | 0 | 0.5 | 0 |  |
| ...... |  |  |  |  |  |  |  |

FIG.7C

|  | SLICE 1 | SLICE 2 | SLICE 3 | SLICE 4 | SLICE 5 | SLICE 6 | ... |
|---|---|---|---|---|---|---|---|
| HEAD | 2.3 | 1.4 | 1.7 | 2.1 | 2 | 2 |  |
| HEAD-NECK | 0 | 0 | 0 | 1.1 | 1.9 | 1.9 |  |
| NECK | 0 | 1.3 | 0 | 0.1 | 1.1 | 2.7 |  |
| CHEST | 2.3 | 1.5 | 2.3 | 0 | 0.6 | 1.1 |  |
| ...... |  |  |  |  |  |  |  |

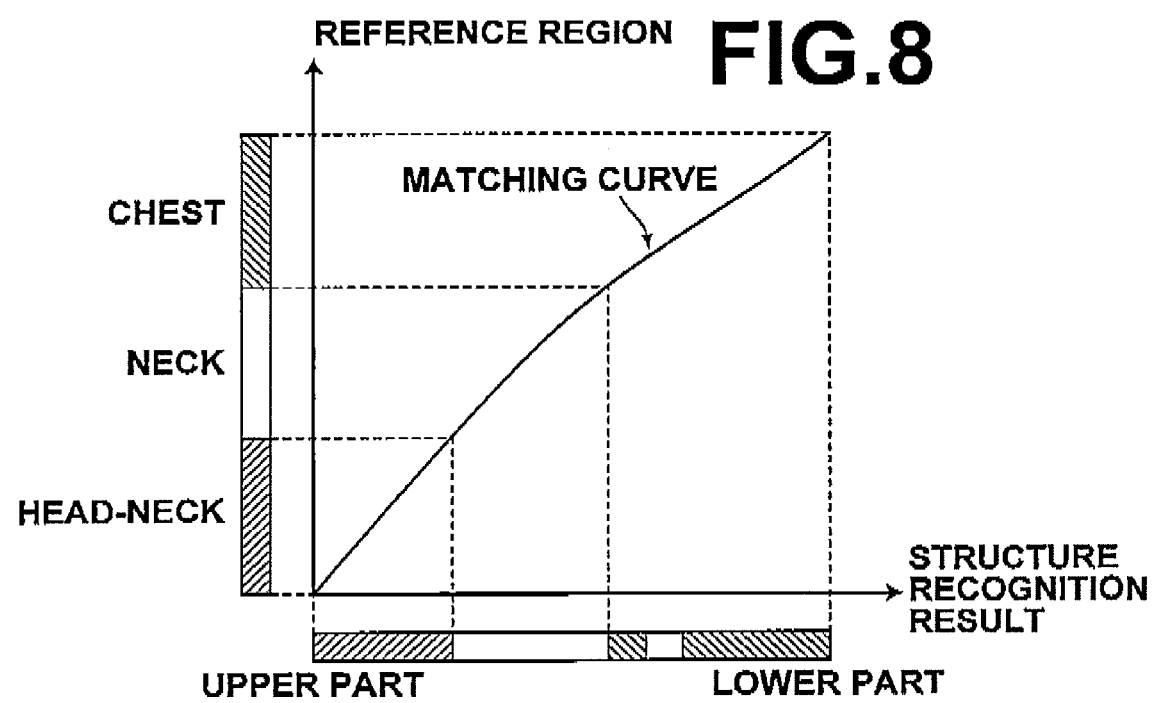

FIG.10

| SLICE NUMBER | REGION RECOGNITION RESULT |
|---|---|
| 1 | NECK |
| 2 | CHEST |
| 3 | CHEST |
| 4 | CHEST |
| 5 | CHEST |
| 6 | CHEST |
| 7 | CHEST |
| 8 | CHEST |
| 9 | CHEST |
| 10 | CHEST-ABDOMEN |

FIG.11

|  | MINIMUM VALUE | MAXIMUM VALUE |
|---|---|---|
| HEAD | ... | ... |
| HEAD-NECK | ... | ... |
| NECK | ... | ... |
| CHEST | 120 | 280 |
| CHEST-ABDOMEN | 20 | 120 |
| ABDOMEN | 100 | 200 |
| PELVIS | ... | ... |
| LEG | ... | ... |

UNIT IN mm

FIG.15

|  | MINIMUM VALUE | MAXIMUM VALUE |
|---|---|---|
| HEAD | ... | ... |
| HEAD-NECK | ... | ... |
| NECK | ... | ... |
| CHEST | 7.06% | 16.47% |
| CHEST-ABDOMEN | 1.18% | 7.06% |
| ABDOMEN | 5.88% | 11.76% |
| PELVIS | ... | ... |
| LEG | ... | ... |

FIG.17

|  | AVERAGE VALUE | STANDARD DEVIATION |
|---|---|---|
| HEAD | ... | ... |
| HEAD-NECK | ... | ... |
| NECK | ... | ... |
| CHEST | 200 | 40 |
| CHEST-ABDOMEN | 70 | 25 |
| ABDOMEN | 150 | 50 |
| PELVIS | ... | ... |
| LEG | ... | ... |

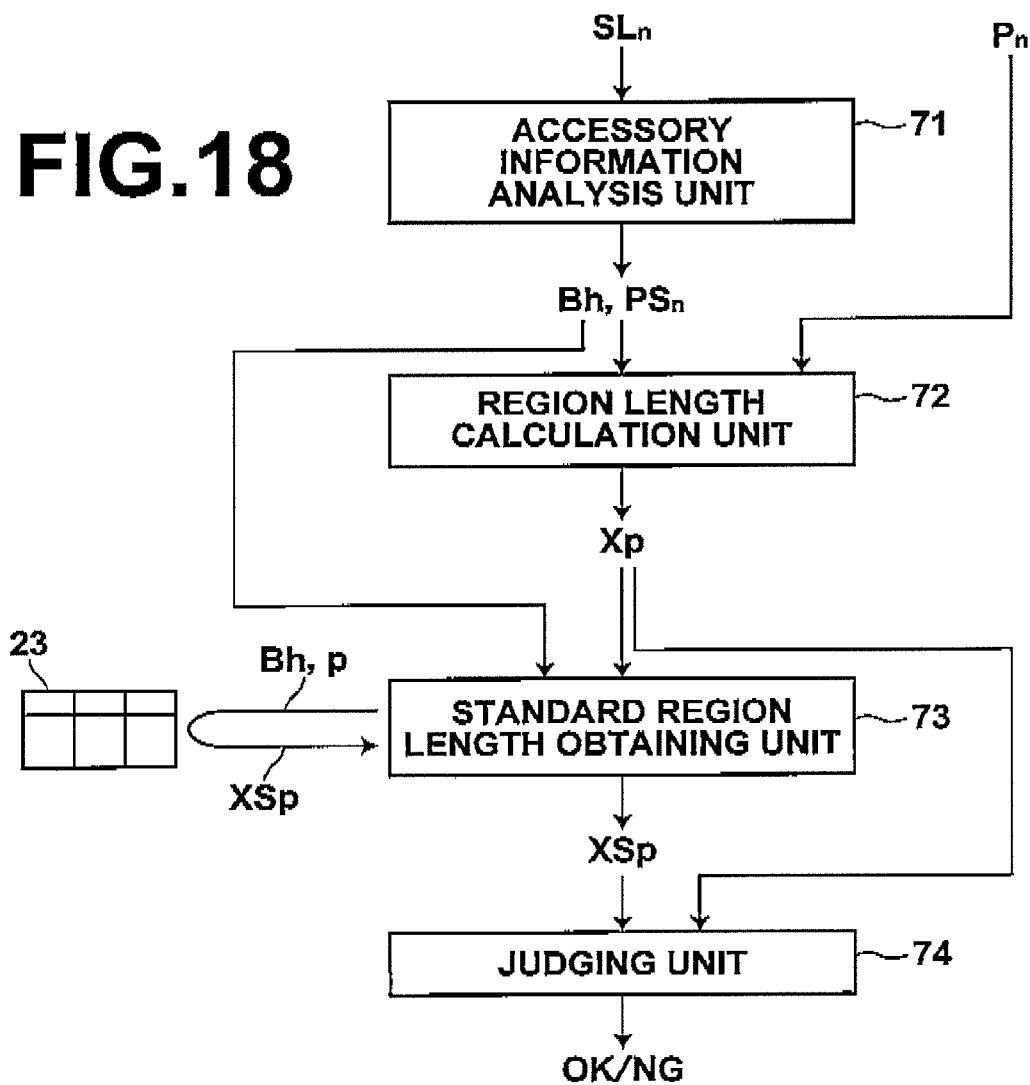

|  | MINIMUM VALUE | MAXIMUM VALUE |
|---|---|---|
| HEAD | ... | ... |
| HEAD-NECK | ... | ... |
| NECK | ... | ... |
| CHEST | 108 | 252 |
| CHEST-ABDOMEN | 18 | 108 |
| ABDOMEN | 90 | 180 |
| PELVIS | ... | ... |
| LEG | ... | ... |

UNIT IN mm

|  | MINIMUM VALUE | MAXIMUM VALUE |
|---|---|---|
| HEAD | ... | ... |
| HEAD-NECK | ... | ... |
| NECK | ... | ... |
| CHEST | 120 | 280 |
| CHEST-ABDOMEN | 20 | 120 |
| ABDOMEN | 100 | 200 |
| PELVIS | ... | ... |
| LEG | ... | ... |

UNIT IN mm

|  | MINIMUM VALUE | MAXIMUM VALUE |
|---|---|---|
| HEAD | ... | ... |
| HEAD-NECK | ... | ... |
| NECK | ... | ... |
| CHEST | 132 | 308 |
| CHEST-ABDOMEN | 22 | 132 |
| ABDOMEN | 110 | 220 |
| PELVIS | ... | ... |
| LEG | ... | ... |

UNIT IN mm

FIG.20

(REFERENCE BODY HEIGHT 170cm)

| | MINIMUM VALUE | MAXIMUM VALUE |
|---|---|---|
| HEAD | ... | ... |
| HEAD-NECK | ... | ... |
| NECK | ... | ... |
| CHEST | 120 | 280 |
| CHEST-ABDOMEN | 20 | 120 |
| ABDOMEN | 100 | 200 |
| PELVIS | ... | ... |
| LEG | ... | ... |

UNIT IN mm

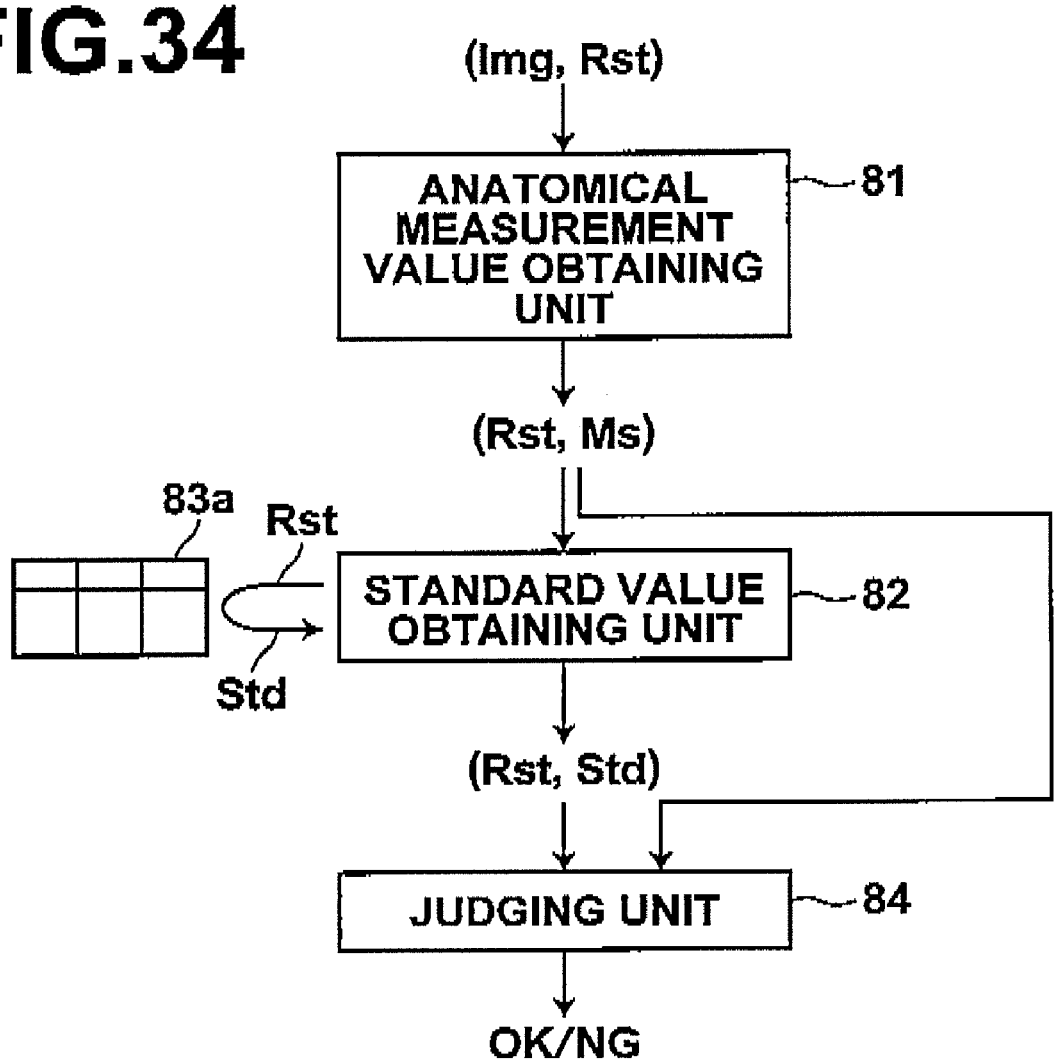

FIG.35A

| MINIMUM VALUE | MAXIMUM VALUE |
|---|---|
| · · · · · | · · · · · |

FIG.35B

| RIB NUMBER | MINIMUM VALUE | MAXIMUM VALUE |
|---|---|---|
| 1 | · · · · · | · · · · · |
| 2 | · · · · · | · · · · · |
| 3 | · · · · · | · · · · · |
| ⋮ | ⋮ | ⋮ |
| 12 | · · · · · | · · · · · |

FIG.37A

| AVERAGE VALUE | STANDARD DEVIATION |
|---|---|
| . . . . . | . . . . . |

FIG.37B

| RIB NUMBER | AVERAGE VALUE | STANDARD DEVIATION |
|---|---|---|
| 1 | . . . . . | . . . . . |
| 2 | . . . . . | . . . . . |
| 3 | . . . . . | . . . . . |
| ⋮ | ⋮ | ⋮ |
| 12 | . . . . . | . . . . . |

| BODY HEIGHT | | MINIMUM VALUE | MAXIMUM VALUE |
|---|---|---|---|
| from | to | | |
| 140 | 160 | ･････ | ･････ |
| 160 | 180 | ･････ | ･････ |
| 180 | 200 | ･････ | ･････ |

(REFERENCE BODY HEIGHT 170cm)

| MINIMUM VALUE | MAXIMUM VALUE |
|---|---|
| ･････ | ･････ |

METHOD, APPARATUS, AND PROGRAM FOR JUDGING IMAGE RECOGNITION RESULTS, AND COMPUTER READABLE MEDIUM HAVING THE PROGRAM STORED THEREIN

BACKGROUND OF THE INVENTION

1. Field of the Invention

The present invention relates to an apparatus and method for judging whether or not recognition results of image recognition processing performed on medical images are correct. The invention also relates to a computer readable recording medium having a program stored therein for causing a computer to perform the method.

2. Description of the Related Art

A variety of technologies for recognizing various structures in medical images are proposed. For example, a technology for recognizing structures represented by tomographic images obtained by imaging a subject with an imaging modality, such as CT or MRI, is known. More specifically, a method in which input images are classified into categories based on medical image management information and image size, then a plurality of candidate template images are selected from a storage storing template images with respect to each category to be recognized using the classification result of the input image, and a comparison is made between each of the selected template images and the input image to determine the category of the template image which best matches with the input image is known as described, for example, in Japanese Unexamined Patent Publication No. 2002-253539. Another method which applies a face recognition method using a unique image and recognizes an imaged direction and imaged region using a unique image with respect to each imaged direction and imaged region, such as liver, chest, stomach, or the like provided in advance using a plurality of image data is also known as described, for example, in Japanese Unexamined Patent Publication No. 2003-10166.

Still another technology such as that for recognizing lung fields by making use of template matching with a medical image representing the chest of a human body as input, or that for recognizing ribs by applying an inputted medical image to a rib model obtained by principal component analysis using multitudes of teacher data are known as described, for example, in Japanese Unexamined Patent Publication No. 2006-6359.

Generally, not all of image recognition results are correct, and it is necessary to check and correct errors of the recognition results, and manual checking and correction thereof places a burden on the part of users. In particular, in the case of three-dimensional images obtained by CT, MRI, or the like, checking target images may amount to huge, so that manual checking and correction causes a large amount of workload on the users.

The image discrimination method, and imaged direction and structure recognition method described in Japanese Unexamined Patent Publication No. 2002-253539 and Japanese Unexamined Patent Publication No. 2003-10166, however, are performed with respect to each medical image. For example, these patent documents do not suggest any problems when discriminating/recognizing a plurality of structures included in a plurality of tomographic images obtained by one series of radiography (e.g., workload of checking and correction described above) and methods for solving the problems. Also, Japanese Unexamined Patent Publication No. 2006-6359 does not suggest any problems and methods of solving the problems.

The present invention has been developed in view of the circumstances described above, and it is an object of the present invention to provide an apparatus and method capable of providing more accurate recognition results while alleviating the burden on the users. It is a further object of the present invention to provide a computer readable recording medium having a program for causing a computer to perform the method recorded therein.

SUMMARY OF THE INVENTION

The image recognition result judging apparatus of the present invention is an apparatus including: an image recognition means that recognizes a predetermined structure in an image representing a subject; a structure measuring means that measures the predetermined structure on the image recognized by the image recognition means to obtain a predetermined anatomical measurement value of the predetermined structure; and a recognition result judging means that judges whether or not the anatomical measurement value falls within a predetermined standard range.

The image recognition result judging method of the present invention is a method including the steps of: recognizing a predetermined structure in an image representing a subject; measuring the predetermined structure on the image recognized by the image recognition means to obtain a predetermined anatomical measurement value of the predetermined structure; and judging whether or not the anatomical measurement value falls within a predetermined standard range.

The computer readable recording medium having the image recognition result judging program of the present invention recorded therein is a medium having a program for causing a computer to perform the method described above.

Hereinafter, details of the present invention will be described.

As a specific example of the "subject", a human body may be cited, but it may be animals or the like.

Specific examples of "predetermined structure" include: bones, such as ribs, vertebral bodies, and cranial bones; organs, such as lungs, and kidneys; and other various anatomical structures including blood vessels, tracheae, bronchial tubes, and the like. Further, the "predetermined structure" is desirable not to be an abnormal region, such as a lesion or the like, but a normal structure from the standpoint of defining the "predetermined standard range". Still further, the "predetermined structure" may include a human body region and contour in an image, an imaged region, or the like. Here, if the subject is a human body, the term "region" means a portion of the body. Specific examples include head, neck, chest, abdomen, pelvis, leg, and a composite region including two adjacent ones thereof, such as head-neck, chest-abdomen, or the like.

As the method of "recognizing (a predetermined structure)", if a method using a discriminator obtained by machine learning using AdaBoost, Support Vector Machine (SVM), Relevance Vector Machine (RVM), Artificial Neural Network (ANN), or the like is used, the effects of the present invention become significant.

As a specific example of "predetermined anatomical measurement value", a value representing at least one of the area, volume, shape, orientation, and positional relationship of a recognized predetermined structure may be cited. The predetermined anatomical measurement value may also include a calculated secondary value such as a ratio using obtained values, as well as the value itself obtained by the measurement of the recognized predetermined structure on the image.

Preferably, "predetermined standard range" is set to a possible range of an anatomical measurement value of the predetermined structure of a standard/average subject.

Further, an arrangement may be adopted in which the anatomical measurement value is assumed to follow a predetermined probability distribution, then a reliability of the probability distribution is obtained, a reliability range in the probability distribution is obtained based on the obtained reliability level, and the judgment is made with the reliability range as the standard range. Here, as a specific example of "predetermined probability distribution", normal distribution may be cited. The "reliability level" may be obtained by accepting a user input or by a certain calculation method.

Further, an arrangement may be adopted in which attribute information representing an attribute of the subject is obtained, then the standard range is determined according to the obtained attribute information, and the judgment is made using the determined standard range. Here, specific examples of "attribute information" include the body height, gender, age, country or area of residence, race group, occupation, respiratory state (respiratory phase, from maximal expiration to maximal inspiration), and the like. The attribute information may be obtained from accessory information of a processing target image, through user input, or by image analysis of the processing target image. As specific methods of "determining the standard range according to the obtained attribute information", the following methods may be cited: a method in which a standard range is predetermined with respect to each category classified based on the attribute information; and, if the attribute information is quantitative information such as a body height, a method in which a standard range for only a reference attribute value is predetermined, and based on a ratio between an attribute value of an inputted image and the reference attribute value or the like, the standard range of the inputted image is determined.

The standard range may be obtained by reading from a storage means storing information that identifies the standard range, or by accepting user input through an input means. Here, the information that identifies the standard range may be the standard range itself, information defining the probability distribution described above, such as the average value of the anatomical measurement values and standard deviation, or information indirectly identifying the standard range, such as a reference attribute value of the subject and the average value of anatomical measurement values of subjects having the attribute value, and the like.

When the anatomical measurement value is judged to be outside of the standard range as a result of the judgment, an output indicating that the image recognition result is incorrect may be provided. Preferably, in this case, the anatomical measurement value judged to be outside of the standard range and the standard range used in the judgment are outputted.

Further, an arrangement may be adopted in which, when the anatomical measurement value is judged to be outside of the standard range as a result of the judgment, correction of the recognition result is performed. More specifically, it is conceivable that the recognition of the predetermined structure is re-performed by changing at least one of the processing conditions of the original image recognition. Here the processing condition may be changed manually by the user or automatically by the apparatus. Further, the recognition result may be automatically corrected by other methods, or manual correction of the recognition result by the user may be accepted.

For example, if the recognition target of the present invention is an imaged region of a subject, it is conceivable that, based on a characteristic of content of each of a plurality of tomographic images representing a plurality of regions of the subject and a relationship of the characteristic of content between each of the tomographic images, a region of the subject represented by each of the tomographic images is determined so as to match with the anatomical relationship of each of the regions of the subject, then a length of the determined region in the direction perpendicular to the tomographic planes of the tomographic images is calculated, and the calculated length is determined whether or not to fall within a predetermined standard length range.

In this case, for an image obtained by CT or MRI, axial section images representing sections perpendicular to the body axis are generally used as the "tomographic images".

As for the method of "determining a region of the subject represented by each of the tomographic images", a method in which a region of the subject represented by each of the plurality of tomographic images is provisionally recognized based on the characteristic of content of each of the tomographic images, and the region represented by each of the tomographic images is determined by correcting the provisionally recognized region in each of the tomographic images such that the positional relationship between the provisionally recognized regions of the respective tomographic images matches with the anatomical positional relationship of the subject. Here, specific examples of the "characteristic of content" include a statistical amount, such as pixel values or an average of pixel values within a small area set in a tomographic image, a ratio of an air region or bone region in a body portion, shape of a body portion, and the like. Specific processing of the "provisional recognition" includes the method using a discriminator obtained by machine learning described above, method of template matching described in Japanese Unexamined Patent Publication No. 2002-253539, method of comparative processing with a unique image described in Japanese Unexamined Patent Publication No. 2003-10166, and the like. The term "anatomical positional relationship" as used herein means an arrangement order of body portions from top to downward, for example, in the case of a human body, the arrangement order of head, neck, chest, abdomen, pelvis, and leg. As a specific example of processing for "determining (correcting) (the structure) such that the anatomical positional relationship is maintained", a method using dynamic programming may be cited.

A specific method of "judging whether or not the length of the determined region in the direction perpendicular to the tomographic planes of the tomographic images falls within a predetermined standard length range", a method in which a predetermined length range for each region is stored, then the predetermined length range of the region corresponding to the region determined by the image recognition processing is obtained therefrom, and the judgment is made using the obtained predetermined length range may be cited. Further, when making the judgment, a ratio of the lengths of two of the regions determined by the image recognition processing may be used.

According to the present invention, a predetermined structure in an image representing a subject is recognized, then the predetermined structure is measured on the image recognized by the image recognition means to obtain a predetermined anatomical measurement value of the predetermined structure, and the anatomical measurement value is automatically judged whether or not to fall within a predetermined standard range. This may alleviate the burden on the user to manually check the validity of the recognition result with respect to the anatomical measurement value, so that more accurate recognition results may be obtained.

In particular, where the image recognition is performed using a discriminator obtained by machine learning, the recognition process is blackboxed and recognition accuracy with respect to each processing target image is unpredictable. But, in the present invention, unpredictable recognition errors may be detected automatically by judging whether or not the anatomical measurement value falls within a standard range after the image recognition processing, so that the effects described above become more significant.

Further, if the standard range, serving as the judgment standard, is determined according to the reliability level in the probability distribution or an attribute of the subject, the judgment standard may be set more finely, which allows more accurate judgment of recognition results.

Still further, when the anatomical measurement value is judged to be outside of the standard range, an output is provided to indicate that the recognition result of the image recognition means is incorrect, so that user may easily understand the recognition result. In particular, if the anatomical measurement value judged to be outside of the standard range and the standard range used in the judgment are outputted, the user may more easily understand the error contents of the recognition result.

When the anatomical measurement value is judged to be outside of the standard range, correction of the recognition result of the image recognition means may contribute to the accuracy improvement of recognition results.

If the image recognition processing is adapted to region recognition processing in which, based on a characteristic of content of each of a plurality of tomographic images representing a plurality of regions of the subject and a relationship of the characteristic of content between each of the tomographic images, a region of the subject represented by each of the tomographic images is determined so as to match with the anatomical relationship of each of the regions of the subject, then, for example, if the subject represented by the tomographic images is a human body, anatomical positional mismatching in which, for example, head is recognized in a tomographic image located below a tomographic image recognized as chest may be eliminated, thereby region recognition accuracy may be improved.

Further, the length of the region determined by the region recognition processing is judged whether or not to fall within a predetermined length range, and if judged to be outside of the predetermined length range, an output indicating so is provided, so that it is possible to discover a structure recognition error from the viewpoint of validity of the length of a structure extending to a plurality of tomographic images and more accurate structure recognition results may be obtained.

BRIEF DESCRIPTION OF THE DRAWINGS

FIG. 7A illustrates scores with respect to each slice and structure (region score) used in structure recognition processing.

FIG. 7B illustrates scores with respect to each slice and structure (weight map) used in structure recognition processing.

FIG. 7C illustrates scores with respect to each slice and structure (cost map) used in structure recognition processing.

FIG. 8 illustrates an example of matching curve used in structure recognition processing.

FIG. 10 illustrates an example method of calculating a structure length.

FIG. 11 illustrates an example of standard structure length table according to the first embodiment.

FIG. 15 illustrates an example of standard structure length table according to a modification of the first embodiment.

FIG. 17 illustrates an example of standard structure length table according to the second embodiment of the present invention.

FIG. 18 is a block diagram of the recognition result judging unit according to a third embodiment of the present invention, schematically illustrating the configuration thereof.

FIG. 19A illustrates an example of standard structure length table according to the third embodiment of the present invention (body height 140 to 160 cm).

FIG. 19B illustrates an example of standard structure length table according to the third embodiment of the present invention (body height 160 to 180 cm).

FIG. 19C illustrates an example of standard structure length table according to the third embodiment of the present invention (body height 180 to 200 cm).

FIG. 20 illustrates an example of standard structure length table according to a modification of the third embodiment of the present invention.

FIG. 34 is a block diagram of recognition result judging unit according to fourth and seventh embodiments of the present invention, schematically illustrating the configuration thereof.

FIG. 35A illustrates an example of normal range table according to the fourth and seventh embodiments (common to all ribs).

FIG. 35B illustrates an example of normal range table according to the fourth and seventh embodiments (with respect to each rib number).

FIG. 37A illustrates an example of normal range table according to the fifth and eight embodiments (common to all ribs).

FIG. 37B illustrates an example of normal range table according to the fifth and eighth embodiments (with respect to each rib number).

DESCRIPTION OF THE PREFERRED EMBODIMENTS

Hereinafter, exemplary embodiments of the present invention will be described with reference to the accompanying drawings. In the following description, a basic configuration and a processing flow will be explained first, then structure recognition processing, rib recognition processing, vertebral body recognition processing will be described as specific implementation examples of image recognition processing.

1. Basic System Configuration and Processing Flow

Figure 1:
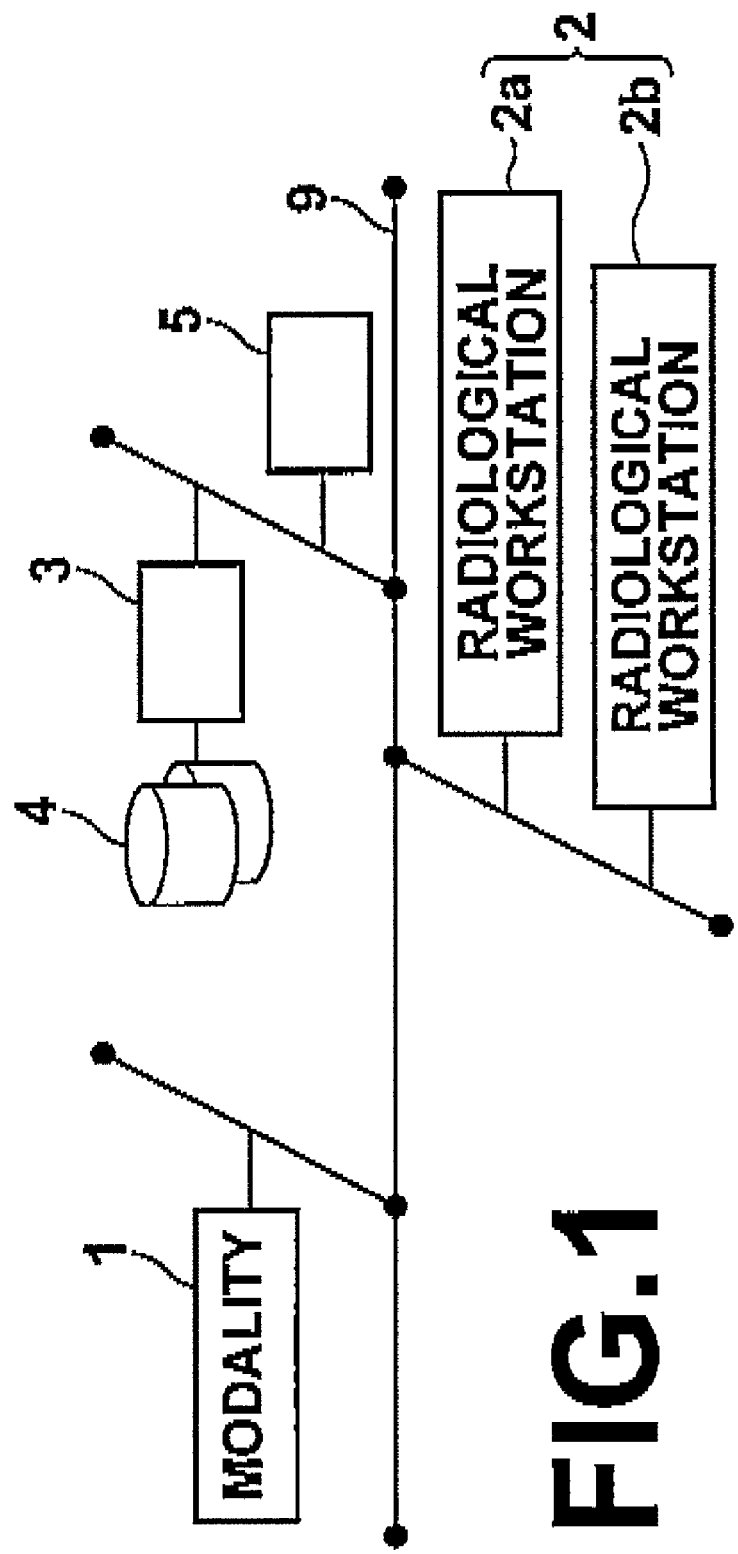
FIG. 1 is a schematic configuration diagram of a medical information system incorporating an image recognition result judging apparatus according to an embodiment of the present invention.

FIG. 1 is a schematic configuration diagram of a medical information system incorporating an image recognition result judging apparatus according to an embodiment of the present invention. As illustrated, the system includes a medical image radiography apparatus (modality) 1, a radiological workstation 2 (2a, 2b), an image information management server 3, an image information database 4, and a structure recognition result correction terminal 5, which are communicatably connected to each other through a network 9. Each of these excluding databases is controlled by a program installed from a recording medium, such as a CD-ROM. Alternatively, the program may be a program which is downloaded from a server connected to a network, such as the Internet, and installed.

The modality 1 includes a device that images an examination target structure of a subject to generate image data of an image representing the structure, and outputs the image data with accessory information defined by DICOM standard attached thereto as image information. The accessory information may be generated according to own standard of a manufacturer of the modality or the like. Specific examples of the modality include CT (Computed Tomography), MRI (Magnetic Resonance Imaging), PET (Positron Emission Tomography), an ultrasound imaging apparatus, and the like. It is noted that a pair of image data representing a subject and accessory information of the image data will be, hereinafter, referred to as "image information". That is, the "image information" includes text information related to the image.

The radiological workstation 2 is used by an image diagnostician that performs radiological reading and provides a radiological report, and includes a processing device, one or two high-resolution displays, and an input device of keyboard/mouse, or the like. In the workstation, the following are performed: an access request for image to the image information management server 3, various types of image processing on an image received from the image information management server 3, display of the image, automatic detection and highlighting of a portion of the image appearing to be a lesion, support of radiological report generation, a registration request for the radiological report or an access request for report to a radiological report server (not shown), display of the radiological report received from the radiological report server, and the like. It is noted that an arrangement may be adopted in which an additional image processing server is connected to the network 9, and the image quality/visibility improvement processing and image analysis processing, such as various types of image processing, automatic detection and highlighting of a lesion candidate, and the like are performed by the image processing server according to respective processing requests from the radiological workstation 2, instead of performing them in the radiological workstation 2.

The image information management server 3 is a relatively powerful general purpose computer having a software program installed therein that provides a data base management system (DBMS) function. In the present embodiment, the computer further includes a software program that provides an image recognition function for recognizing a predetermined structure of a subject represented by an image transmitted from the modality 1 and a function for judging recognition results (to be described in detail later). The image information management server 3 also includes a large capacity storage constituting the image information database 4. The storage may be a large capacity hard disk connected to the image information management server 3 by a data bus or a disk device connected to a NAS (Network Attached Storage) or a SAN (Storage Area Network) connected to the network 9.

When a registration request for image information is received from the modality 1, the image information management server 3 arranges the image information into a database format and registers the arranged image information on the image information database 4.

In the image information database 4, image data representing a subject image and accessory information are registered. The accessory information may include, for example, an image ID for identifying an individual image, a patient ID for identifying a subject, a unique ID (UID) allocated to each image information, inspection date and time when the information is generated, type of modality used for obtaining the image information, patient information including the name, age, gender, and the like, inspected structure (imaged region), imaging information (imaging protocol, imaging sequence, imaging method, imaging condition, use of contrast agent, and the like), serial number or acquisition number when a plurality of images is obtained by a single inspection. The image information can be managed, for example, as XML data or SGML data.

When an access request for image information is received from the radiological workstation 2 via the network 9, the image information management server 3 searches the image information database 4 for the requested image information, and transmits the extracted image information to the requesting radiological workstation 2.

When an operation for making access request for a target image of radiological reading is performed by a user, such as an image diagnostician, the radiological workstation 2 transmits the access request to the image information management server 3 to obtain the image information required for the radiological reading. Then, the workstation displays the obtained image information on the monitor screen, and performs automatic detection of a lesion and the like in response to a request from the image diagnostician.

The structure recognition result correction terminal 5 is an apparatus for displaying/correcting an image recognition result of an image of a subject obtained by the modality 1, such as CT or MRI, before or after the image is registered in the image information database 4. It is a computer, such as a personal computer or a workstation having a processing device, one or two high-resolution displays, and an input device of keyboard/mouse. The processing detail will be described later.

The network 9 is a local area network connecting various types of apparatuses and devices in a hospital. In the case where the radiological workstation 2 is installed also in another hospital or clinic, the network 9 may be configured by a local area network of each hospital and the Internet or a dedicated line connecting the local area networks. In any case, it is desirable that the network 9 is a high-speed transmission network for transmission of image information, such as an optical network.

Figure 2:
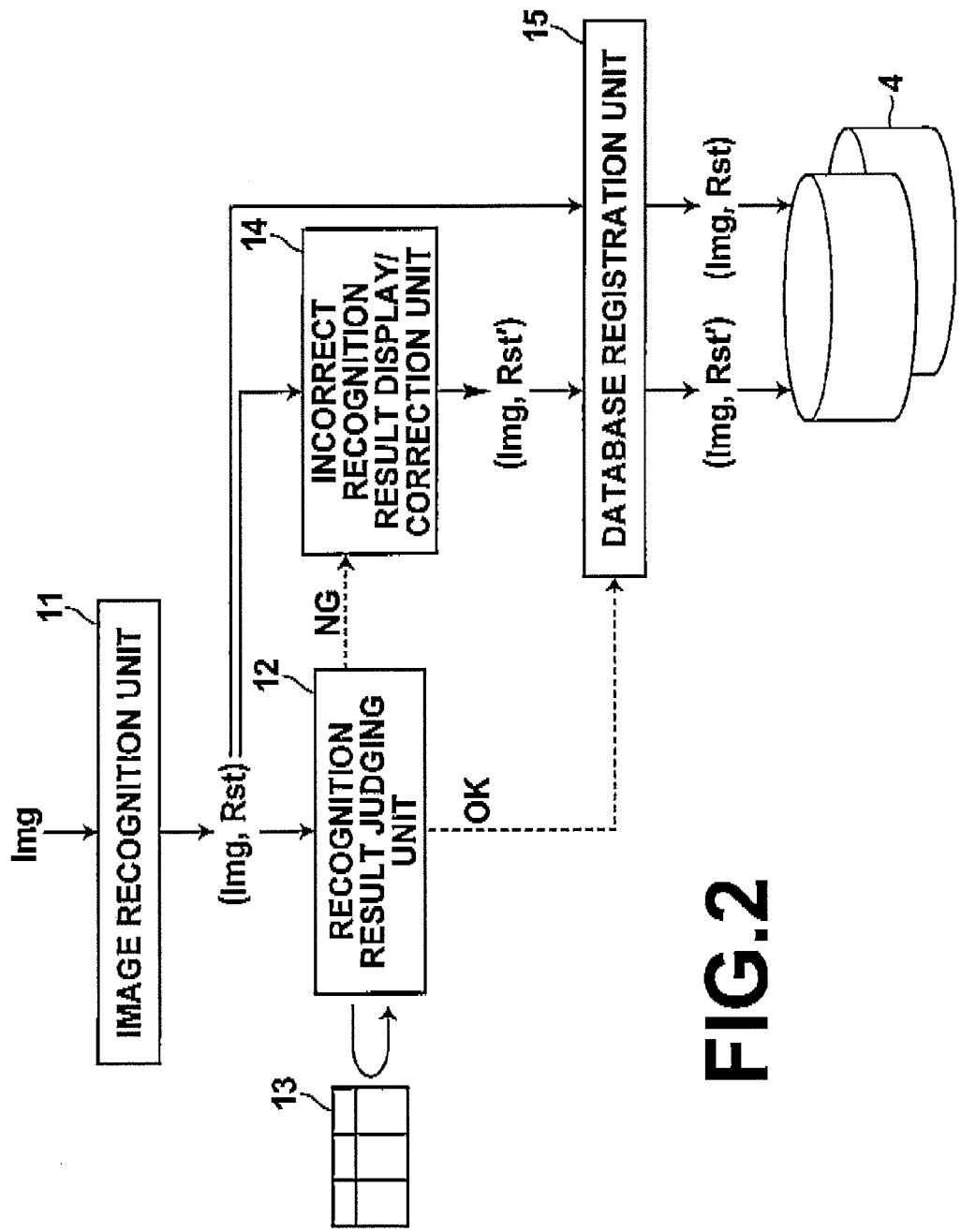
FIG. 2 is a functional block diagram of the image recognition result judging apparatus according to an embodiment of the present invention, schematically illustrating data flow between each functional block.

FIG. 2 is a functional block diagram of the image recognition result judging apparatus according to an embodiment of the present invention, schematically illustrating data flow between each functional block. As illustrated, the apparatus includes an image recognition unit 11, a recognition result judging unit 12, a standard range table 13, an incorrect recognition result display/correction unit 14, and a database registration unit 15. Of these, only the incorrect recognition result display/correction unit 14 is implemented in the recognition result correction terminal 5 and other components are implemented in the image information management server 3.

With image data Img as input, the image recognition unit 11 recognizes a predetermined structure in an image represented by the inputted image data and outputs a recognition result Rst thereof.

Based on the recognition result Rst, the recognition result judging unit 12 measures the recognized predetermined structure on the image Img to obtain a predetermined anatomical measurement value of the predetermined structure, obtains information of a standard range the anatomical measurement value may possibly take from the standard range table 13, judges whether or not the anatomical measurement value is within the standard range, determines that the recognition result Rst is correct if the anatomical measurement value is within the standard range and determines that the recognition result Rst is incorrect if the anatomical measurement value is not within the standard range.

The standard range table 13 includes information of a possible standard range of the anatomical measurement value.

With a processing target image data Img and an incorrect recognition result Rst as input, the incorrect recognition result display/correction unit 14 displays these, provides a user interface, and outputs a corrected recognition result Rst'.

The database registration unit 15 registers the processing target image data Img in the image information database 4 with the recognition results Rst recognized by the image recognition unit 11 or, if the recognition results are corrected the corrected recognition results Rst' attached as accessory information.

Figure 3:
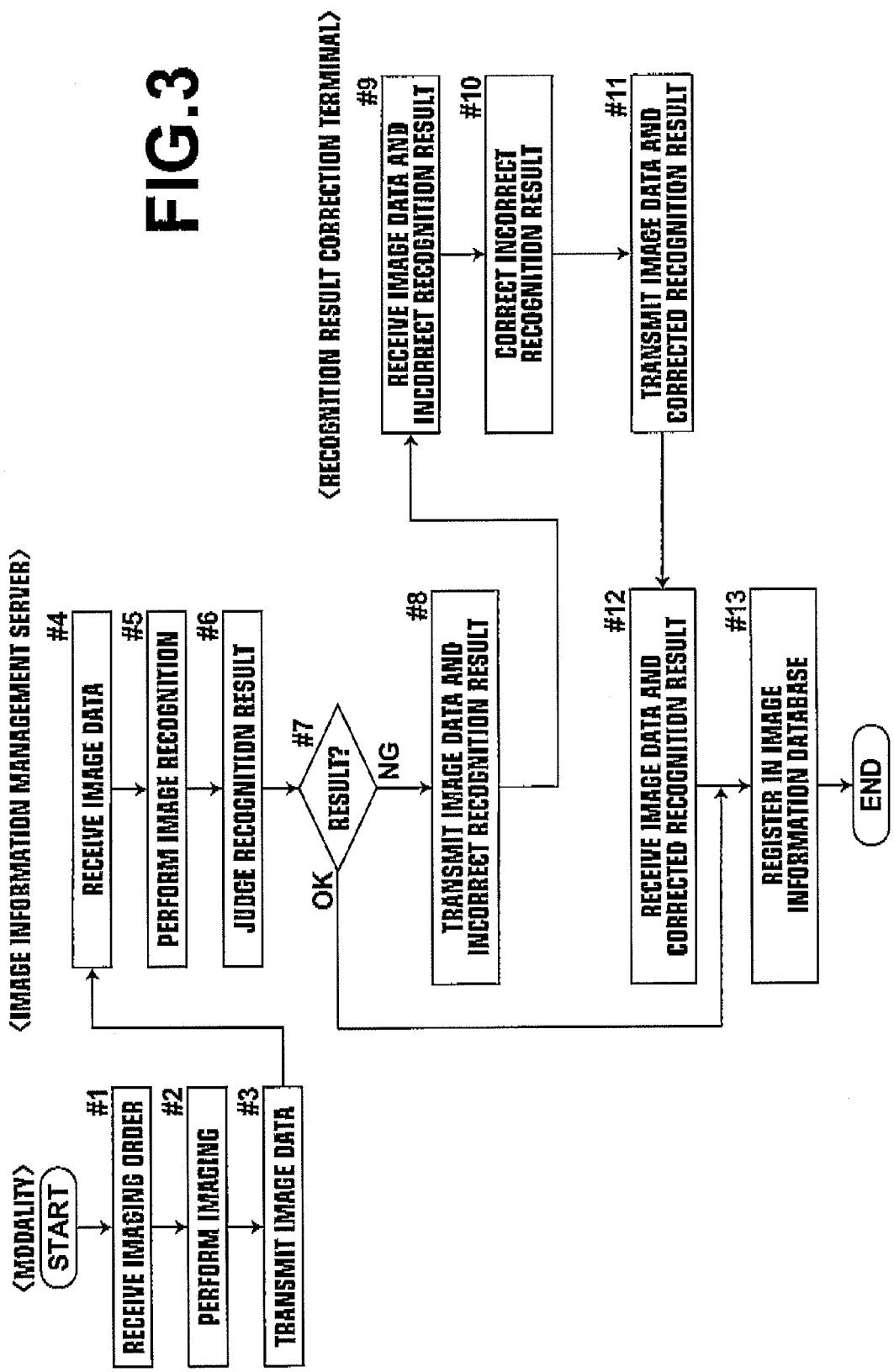
FIG. 3 is a flowchart illustrating an example of workflow of image recognition result judging/correction processing according to an embodiment of the present invention.

Next, a workflow of image recognition result judging and correction processing of the present invention will be described with reference to the flowchart of FIG. 3 and the block diagram of FIG. 2.

First, an imaging order is received in an imaging room where the modality 1 is installed (#1), and imaging of the subject is performed based on the imaging order using the modality 1 to obtain a processing target Img (#2). Then, the image data Img are transmitted to the image information management server 3 (#3).

Next, the image information management server 3 receives the image data Img transmitted from the modality 1 (#4), and the image recognition unit 11 recognizes a predetermined structure in an image represented by the image data Img and outputs a recognition result Rst (#5). The recognition result judging unit 12 obtains a predetermined anatomical measurement value of the predetermined structure in the image based on the image data Img and recognition result Rst, obtains a standard range the anatomical measurement value may possibly take and determines whether or not the recognition result Rst is correct based on whether or not the anatomical measurement value is within the standard range (#6). If the determination result shows that the recognition result Rst is incorrect (#7: NG), the image information management server 3 records the incorrect recognition result Rst as accessory information of the image data Img, and transmits these data (Img, Rst) to the recognition result correction terminal 5 (#8).

After the structure recognition result correction terminal 5 receives the data (Img, Rst) from the image information management server 3 (#9), the incorrect recognition result display/correction unit 14 causes an image represented by the image data Img and the incorrect recognition result Rst to be displayed on a display, accepts a correction of the incorrect recognition result Rst by the user, and records the corrected recognition result Rst' in the accessory information of the image data Img (#10). The recognition result correction terminal 5 transmits the corrected data (Img, Rst') to the image information management server 3 (#11).

The image information management server 3 receives the data (Img, Rst') from the recognition result correction terminal 5 (#12), and the database registration unit 15 registers the data (Img, Rst') in the image information database 4 (#13). If the recognition results Rst are judged correct in the recognition result judging unit 12 (#7: OK), processing steps from #8 to #12 are not performed, and the image information management server 3 records the original recognition results Rst as the accessory information of the image data Img, and the database registration unit 15 registers the data in the image information database.

As described above, in the system employing the image recognition result judging apparatus of the present invention, a predetermined structure in an image Img representing a subject is recognized by the image recognition unit 11 in the image information management server 3, then an anatomical measurement value of the predetermined structure is obtained by the recognition result judging unit 12 by measuring the recognized predetermined structure on the image Img, and an automatic determination is made as to whether or not the anatomical measurement value is within a predetermined standard range. This alleviates the burden on the user for manually checking recognition results with respect to anatomical measurement values and allows more accurate recognition results to be obtained.

Further, if the anatomical measurement value is judged to be outside of the standard range in the recognition result judging unit 12, information indicating that the recognition result is incorrect is outputted by the incorrect recognition result display/correction unit 14 in the structure recognition result correction terminal 5. This allows the user to easily identify the incorrect recognition result. Still further, a correction of the recognition result Rst is performed in the incorrect recognition result display/correction unit 14 of the recognition result correction terminal 5, which contributes to accuracy improvement of recognition results.

2. Implementation Example of Structure Recognition Processing

Embodiments 1 to 3

Figure 4:
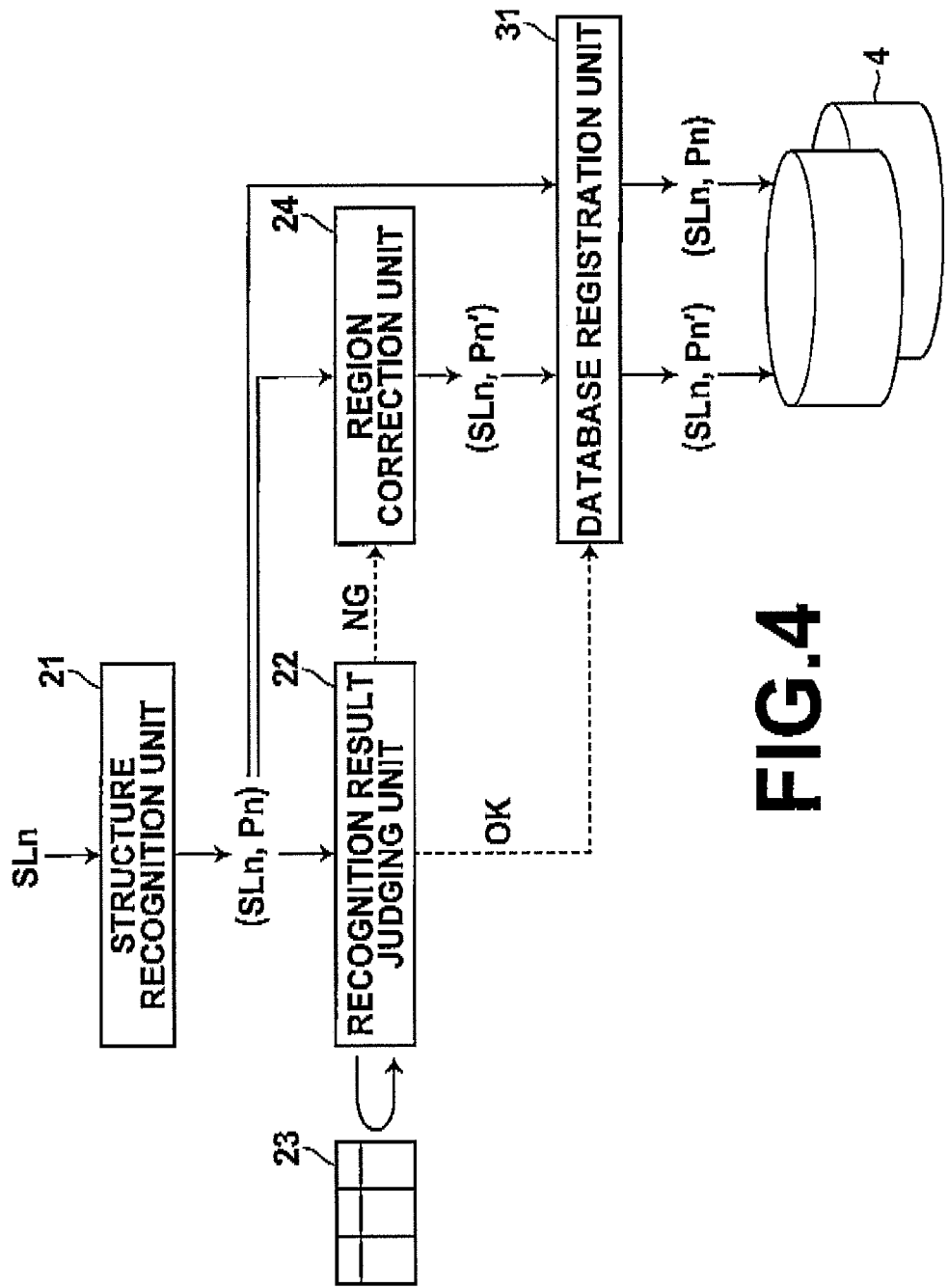
FIG. 4 is a block diagram of a structure recognition result correction apparatus according to a first embodiment, schematically illustrating the configuration thereof including periphery.

FIG. 4 is a block diagram of a structure recognition result correction apparatus that realizes structure recognition/correction processing according to a first embodiment of the present invention, schematically illustrating the configuration and data flow thereof. As illustrated, the apparatus includes a structure recognition unit 21 (corresponding to the image recognition unit 11 shown in FIG. 2), a recognition result judging unit 22 (corresponding to the recognition result judging unit 12 shown in FIG. 2), a standard structure length table 23 (corresponding to standard range table 13), a region correction unit 24 (corresponding to incorrect recognition result display/control unit shown in FIG. 2), and a database registration unit 31 (corresponding to the database registration unit 15). The structure recognition unit 21 recognizes a structure $P_n$ of a body represented by each of tomographic images $SL_n$ (n=1, 2, - - - ), and the recognition result judging unit 22 obtains a length of each structure $P_n$ along the body axis direction, obtains a standard length of each structure by referring to the standard structure length table 23 to determine whether or not the length of each structure $P_n$ is within the standard length range. Then, if the length is determined to be outside of the standard length range, the structure correction unit 24 corrects the structure, and the database registration unit 31 registers the final recognition results $(SL_n, P_n)$ (without correction) or $(SL_n, P_n')$ (with correction). Hereinafter, each of the units will be described in detail.

The structure recognition unit 21 a processing unit implemented in the image information management server 3. It performs structure recognition processing on a plurality of inputted tomographic images representing a plurality of structures of a subject of human body, obtained by CT, determines a structure represented by each tomographic image, and outputs information corresponding to the determined structure (e.g., text of structure name or code identifying each structure) by attaching the information to the corresponding tomographic image as accessory information based on DICOM standard. The structure recognition processing determines a structure represented by each tomographic image such that the arrangement order of head, head-neck, neck, chest, chest-abdomen, abdomen, pelvis, and leg is maintained when the tomographic images are arranged in the order of human body regions from top to bottom.

Figure 5:
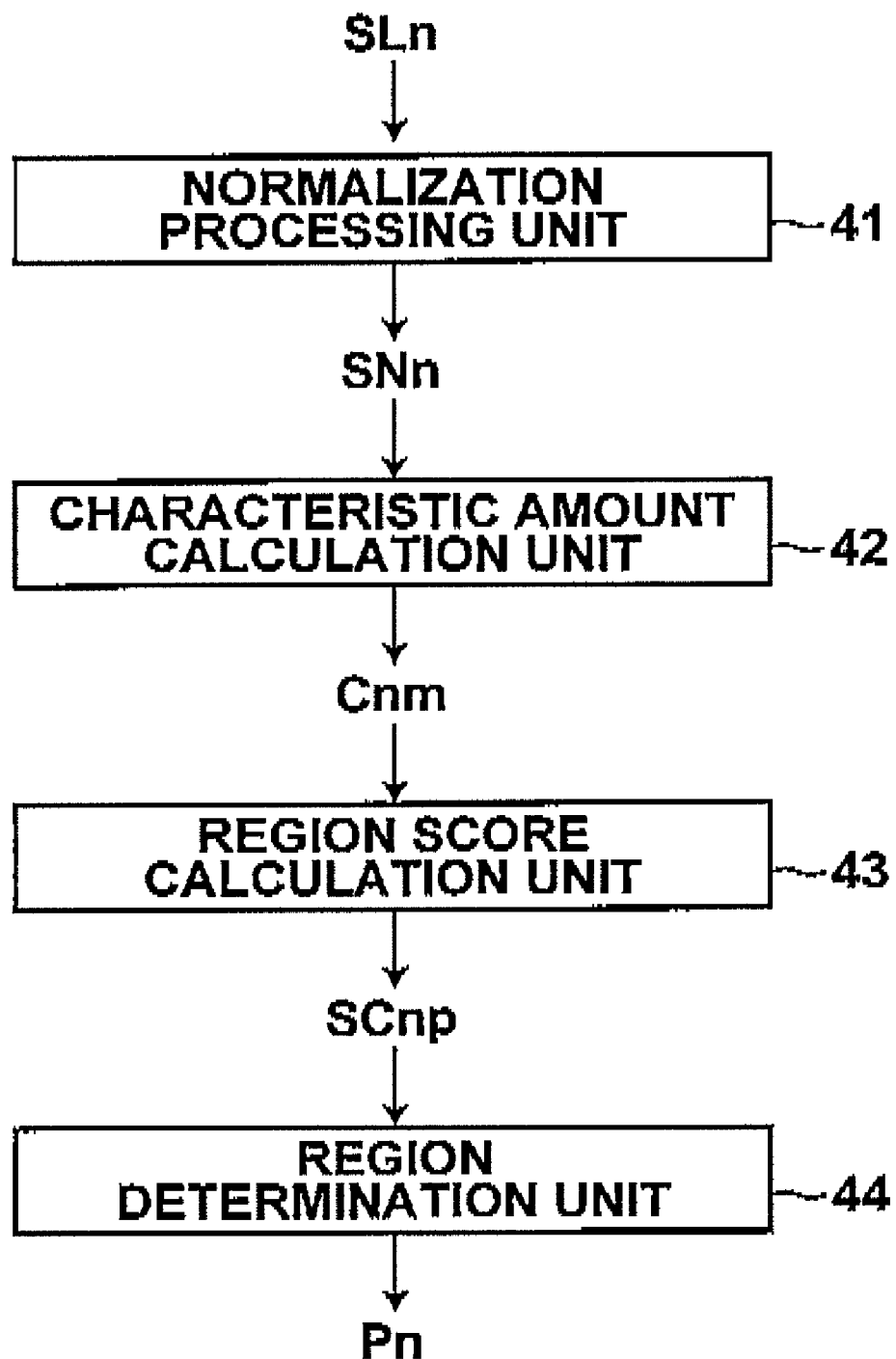
FIG. 5 is a block diagram of a structure recognition unit, schematically illustrating the configuration thereof.

FIG. 5 is a block diagram illustrating the processing of the structure recognition unit 21 in detail. As illustrated, the structure recognition unit 21 includes a normalization processing unit 41 for normalizing inputted tomographic images $SL_n$ (n=1, 2, - - - ), a characteristic amount calculation unit 42 for calculating many characteristic amounts $c_{nm}$ (m=1, 2, - - - ) from the normalized tomographic images $SN_n$, a region score calculation unit 43 for calculating region scores $sc_{np}$ (p=head, head-neck, neck, chest, chest-abdomen, abdomen, pelvis, and leg) that represents structure likelihoods of each structure by inputting characteristic amounts $c_{nm}$ calculated with respect to each normalized tomographic image $SN_n$ to a discriminator obtained by AdaBoost method, and a region determination unit 44 for determining a region $P_n$ represented by each inputted tomographic image $SL_n$ by dynamic programming method with the calculated region scores $sc_{nm}$ as input such that the body arrangement described above is maintained.

The normalization processing unit 41 extracts a human body region from each input image $SL_n$, calculates a landmark (reference point) from information of the extracted human body region, and generates a normalized image $SN_n$ by performing scaling, translation, or rotation through Affine transform with reference to the calculated landmark. The purpose of the normalization is to eliminate variations in the size and inclination of human body region in the inputted tomographic images $SL_n$ arising from individual variability, imaging condition, and the like, and aligning the positions of the regions (e.g., bone region or air region) in the human body region, thereby improving efficiency and accuracy of the structure recognition processing that follows.

Here, the method for extracting the human body region from input images $SL_n$ may be any known method at the time when the present invention is practiced. For example, a method as described, for example, in Japanese Unexamined Patent Publication No. 9 (1997)-187444 or the like may be used. The method extracts candidate contours of a human body region from each input image $SL_n$ after performing binarization processing and noise removing processing, then removes a contour having an inner area smaller than a predetermined threshold value, and determines the inside of the remaining contour as the human body region.

Figure 6A:
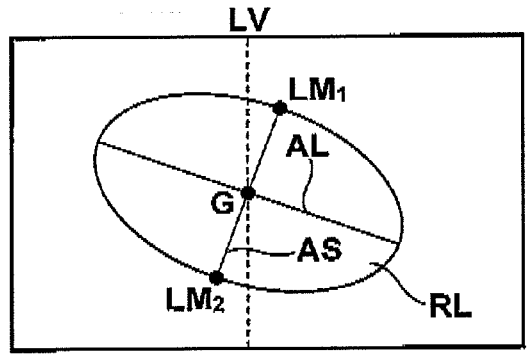
FIG. 6A is a drawing schematically illustrating a landmark setting method for normalizing a tomographic image (labeling number=1, for horizontally elongated human body region).
Figure 6B:
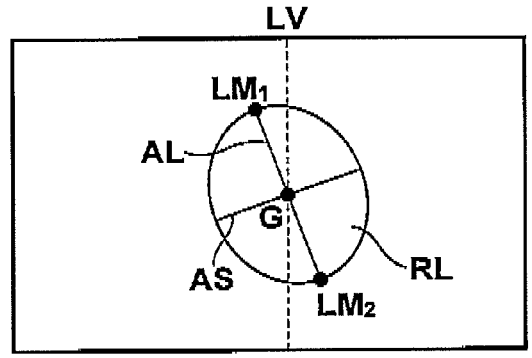
FIG. 6B is a drawing schematically illustrating a landmark setting method for normalizing a tomographic image (labeling number=1, for vertically elongated human body region).
Figure 6C:
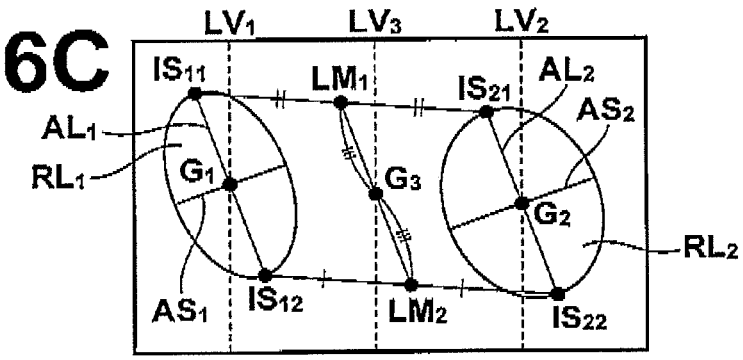
FIG. 6C is a drawing schematically illustrating a landmark setting method for normalizing a tomographic image (labeling number=2).
Figure 6D:
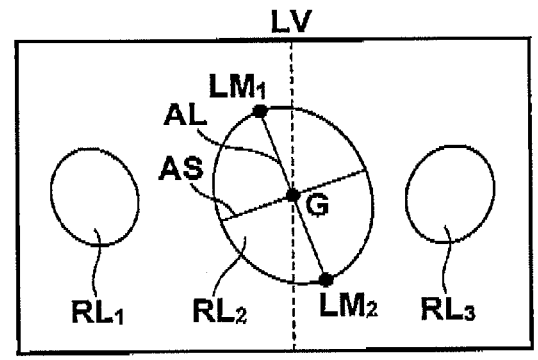
FIG. 6D is a drawing schematically illustrating a landmark setting method for normalizing a tomographic image (labeling number=3).

Further, landmarks may be two points which are the intersecting points of a contour line and a median plane. More specifically, landmarks may be obtained according to the labeling number obtained by performing labeling processing on the extracted human body region as illustrated in FIGS. 6A to 6D. If the labeling number is 1 as is in FIGS. 6A and 6B, the gravity point G of the labeling area (human body region) RL is obtained, and a long axis AL and a short axis AS passing the gravity point G, as well as a straight line LV passing the gravity point and extending in the vertical direction of the tomographic image $SL_n$ are set. Then, intersecting points of one of the long axis AL and short axis AS, forming a smaller angle with the straight line LV, and the contour of the human body region RL are determined as landmarks $LM_1$ and $LM_2$. FIG. 6A schematically illustrates the case where the angle formed between the short axis AS and straight line LV is smaller than the angle formed between the long axis AL and straight line LV which corresponds to an image representing the chest, chest-abdomen, abdomen, and pelvis. FIG. 6B schematically illustrates the case where the angle formed between the long axis AL and straight line LV is smaller than the angle formed between the short axis AL and straight line LV which corresponds to an image representing the head, head-neck, and neck. FIG. 6C illustrates the case where the labeling number is two which corresponds to an image representing leg. In this case, gravity points $G_1$ and $G_2$ are obtained with respect to the labeling areas $RL_1$ and $RL_2$ respectively, and long axes $AL_1$, $AL_2$, short axes $AS_1$, $AS_2$ passing the gravity points $G_1$ and $G_2$ respectively and straight lines $LV_1$, $LV_2$ passing the gravity points $G_1$ and $G_2$ respectively and extending in the vertical direction of the tomographic image $SL_n$ are set. Then, intersecting points of one of the long axis $AL_1$ and short axis $AS_1$, forming a smaller angle with the straight line $LV_1$, are designated as $IS_{11}$ and $IS_{12}$. Likewise, intersecting points of one of the long axis $AL_2$ and short axis $AS_2$, forming a smaller angle with the straight line $LV_2$, are designated as $IS_{21}$ and $IS_{22}$. Then, midpoints of line segments $IS_{11}$ to $IS_{21}$ and $IS_{12}$ to $IS_{22}$ which do not cross to each other are set as landmarks $LM_1$, $LM_2$. If the area ratio of the two labeling areas is not within a predetermined range, that is, the difference in area between the two labeling areas is greater than a predetermined threshold value, the smaller labeling area is determined to be a medical appliance or the like, and processing identical to that of the case when the labeling number is one is performed. FIG. 6D is a case where the labeling number is three which corresponds to an image representing neck and both arms. In this case, processing identical to that where the labeling number is one is performed on one of the labeling regions $RL_1$, $RL_2$, and $RL_3$ having a largest area ($RL_2$) to obtain landmarks $LM_1$ and $LM_2$. In FIGS. 6A, 6B, and 6D, if the distance from the straight line LV to each of the landmarks $LM_1$ and $LM_2$ are greater than a predetermined threshold value, correction processing may be performed such that the positions of the landmarks $LM_1$ and $LM_2$ are moved closer to the straight line LV along the contour of the area RL. Likewise, in FIG. 6C, if the distance from the straight line $LV_3$ passing the midpoint $G_3$ of the line segments $IS_{11}IS_{21}$ and $IS_{12}IS_{22}$ and extending the vertical direction of the tomographic image $SL_n$ to each of the landmarks $LM_1$ and $LM_2$ is greater than a predetermined threshold value, correction processing may be performed such that the positions of the landmarks $LM_1$ and $LM_2$ are moved closer to the straight line $LV_3$ along the line segments $IS_{11}IS_{21}$ and $IS_{12}IS_{22}$. A specific example of moving amount is that the landmarks $LM_1$ and $LM_2$ are moved such that the distance from the straight line LV or $LV_3$ to each of the landmarks $LM_1$ and $LM_2$ are reduced by 20%.

With reference to the landmarks $LM_1$ and $LM_2$ obtained in the manner as described above, each of the tomographic images $SL_n$, are normalized, through Affine transform or the like, such that the landmarks $LM_1$ and $LM_2$ are located in the center of the image in the horizontal direction with the distance between them becomes a predetermined value.

The characteristic amount calculation unit 42 calculates many characteristic amounts $c_{nm}$ from each of the normalized images $SN_n$. Specific examples of the characteristic amounts $c_{nm}$ include pixel values, average of the pixel values, maximum value, minimum value, median value in a block (e.g., 3×3 pixels or the like) set within a normalized image $SN_n$, ratio of an air region or a bone region in a human body region extracted by threshold processing to the human body region, the area ratio of the human body region to the area of a circle having the same perimeter length as the human body region (degree of circularity), and the like. It is noted that the characteristic amounts $c_{nm}$ may be calculated amounts themselves or multinarized values thereof.

The region score calculation unit 43 calculates each of the region scores $sc_{np}$ representing region likelihood with respect to each of the tomographic image $SL_n$, by inputting the characteristic amounts $c_{nm}$ to a group of discriminators for each region obtained by training based on AdaBoost method. Here, the group of discriminators of each region is obtained through training using many types of characteristic amounts calculated from each of training samples including a plurality of images known to representing the region and a plurality of images known not to representing the region. The group of discriminators of one region includes one or more discriminators. If it includes two or more discriminators, they have a complementary relationship with respect to discrimination performance. The same numbers of discriminator groups as the types of regions to be discriminated are generated, and the type of characteristic amount is determined with respect to each discriminator group. For details of the training and region score calculation method, reference is directed to Japanese Unexamined Patent Publication No. 2005-108195. The region score calculation method may be a method using discriminators generated by a different training method, such as artificial neural network (ANN), support vector machine (SVM), relevance vector machine (RVM), a method that determines a region score based on one characteristic amount or a combination of a plurality of characteristic amounts using a reference table, or the like other than the method described above. The processing of the characteristic amount calculation unit 42 and the processing of the region score calculation unit 43 may be replaced with the processing described in Japanese Unexamined Patent Publication No. 2002-253539 or Japanese Unexamined Patent Publication No. 2003-10166 in which a degree of similarity obtained by template matching (Japanese Unexamined Patent Publication No. 2002-253539) or comparison with the characteristic image (Japanese Unexamined Patent Publication No. 2003-10166) is determined as the region score.

Through the processing described above, each of the scores $sc_{np}$ for each region is determined with respect each of the tomographic images $SL_n$. FIG. 7A is a table illustrating an example of scores $sc_{np}$ calculated for the respective regions of respective tomographic images (slices) $SL_n$, which indicate that the higher the value of the region score the higher the probability of the slice to representing the region. In the table, tracing of a region having a maximum region score with respect to each of the slices $SL_n$ results in the following: slice 1—head, slice 2—head-neck, slice 3—neck, slice 4—chest, slice 5—neck, slice 6—chest, mismatching with the arrangement order of human body regions. Consequently, a correction is made by the processing of the region determination unit 44 that follows.

The region determination unit 44 performs processing to make a final decision on each of the regions $P_n$ represented by each of the tomographic images $SL_n$, such that mismatching does not occur between the arrangement order of human body regions, that is, reference regions of human body arranged in the order of head, head-neck, neck, chest, chest-abdomen, pelvis, and leg provided in advance and maximum values of region scores in the tomographic images $SL_n$. Here, an arrangement is made in which a cost is incurred if mismatching occurs between the reference region and maximum value of the region scores $sc_{np}$ in each of tomographic images $SL_n$, and a final decision on the regions $P_n$ is made by obtaining a path having a lowest cost and shortest length. More specifically, a method for solving an optimization problem may be used. In the present embodiment, a dynamic programming method (DP matching) will be described as one of the specific examples.

First, with respect to region scores $sc_{np}$ shown in FIG. 7A, region scores in each slice are subtracted from the maximum value in the slice. This yields a weight map shown in FIG. 7B in which magnitude relation of the region scores $sc_{np}$ is reversed, that is, each of the region scores $sc_{np}$ is converted to a value greater than or equal to zero, and the region score having a highest score is converted to zero. Here, when generating the weight map, conversion using a reference table may be used instead of the subtraction method described above.

Next, with the weigh map shown in FIG. 7B as input, a path having a lowest cost and path length is calculated by the DP matching. Here, the description of a method made by the applicant of the present invention in Japanese Patent Application No. 2006-140041 will be cited. First, with the weigh map shown in FIG. 7B as input, a cost map shown in FIG. 7C is generated. In FIG. 7C, the cost of each cell (n, p) is set in the following manner. Here, n indicates the slice number, and p is the number representing a region (1: head-neck, 2: neck, 3: chest).

(1, 1): value at (1, 1) in the weight map (FIG. 7B)
(n, 1): value at (n−1, 1) in the weight map+predetermined value (0, here)
(1, m): value at (1, m−1) in the weight map+predetermined value (0, here)
(n, m): minimum value among (i) to (iii) shown below.
(i) value at (n−1, m−1) in the cost map+value at (n, m) in the weight map
(ii) value at (n, m−1) in the cost map+value at (n, m) in the weight map+predetermined value (1.0 here)
(iii) value at (n−1, m) in the cost map+value at (n, m) in the weight map+predetermined value (1.0 here)

Next, minimum values are sequentially traced on the cost map from right to left. This yields a correspondence map between the slice number and region.

This results in that the processing for making a final decision on the region of each of the slices $SL_n$ is completed, in which a provisional recognition result based on the maximum value of the region scores $sc_{np}$ in each of the slices $SL_n$ is replaced by the corresponding reference region based on the matching curve with the arrangement order of human body regions (reference regions) as the vertical axis and the provisional recognition result as the horizontal axis.

The recognition result display control unit 22 is a processing unit implemented in the image information management server 3. It obtains a length of each of a plurality of regions $P_n$ represented by the tomographic images $SL_n$ in the body axis direction, obtains a standard length of each region by referring to the standard region length table 23, and determines whether or not the length of each of the regions $P_n$ is within the standard length range.

Figure 9:
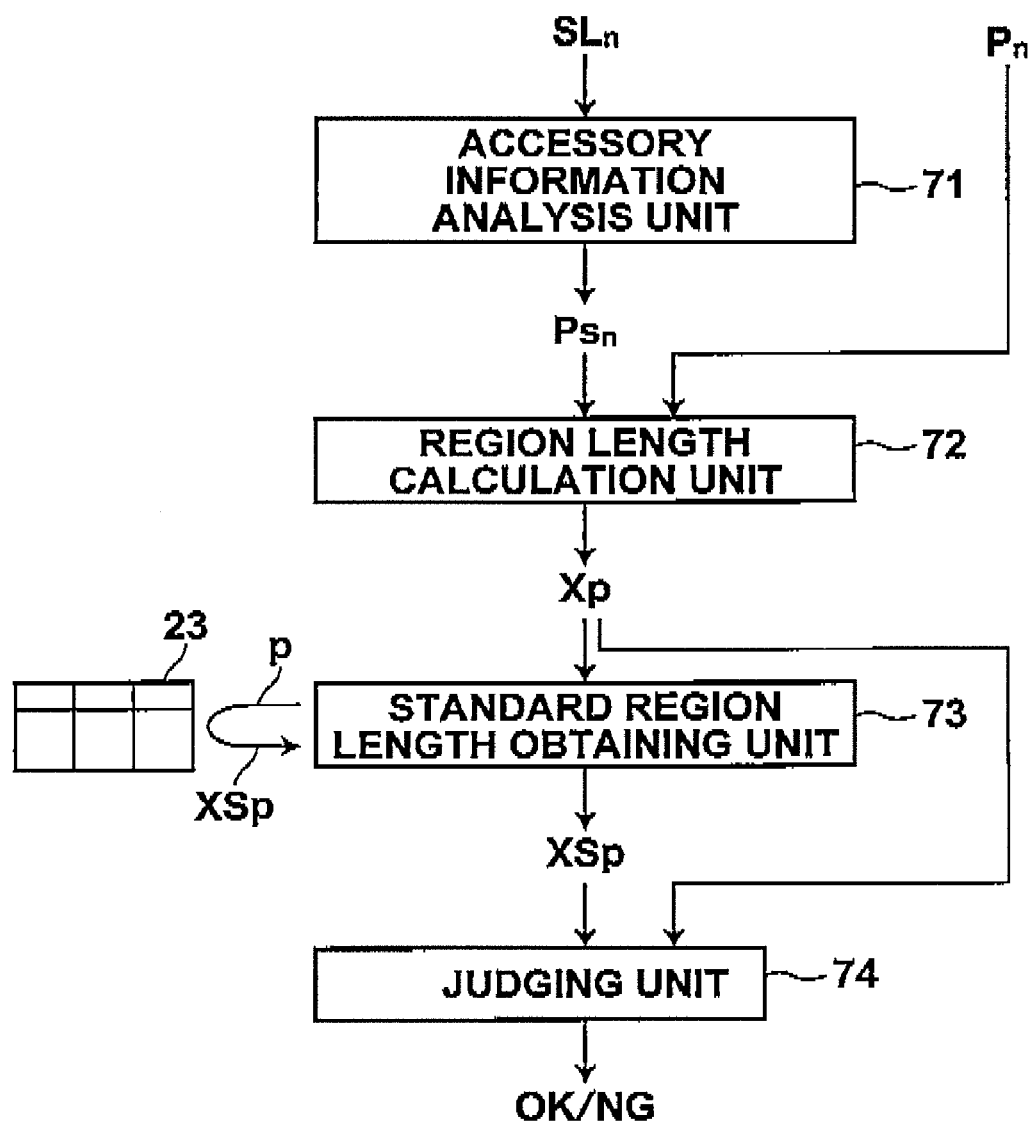
FIG. 9 is a block diagram of a recognition result judging unit according to the first embodiment schematically illustrating the configuration thereof.

FIG. 9 is a block diagram of the recognition result judging unit 22 illustrating detailed processing thereof. As illustrated, the recognition result judging unit 22 includes an accessory information analysis unit 71, a region length calculation unit 72, a standard region length obtaining unit 73, and a judging unit 74 to perform the following processing.

The accessory information analysis unit 71 analyzes accessory information of inputted tomographic images $SL_n$ to obtain the slice position $PS_n$ of each of the tomographic images $SL_n$.

The region length calculation unit 72 calculates a length (region length) $X_p$ of each of recognized regions represented by inputted tomographic images $SL_n$ in the direction perpendicular to the tomographic plane (body axis direction) based on the region recognition result $P_n$ of each of inputted tomographic images $SL_n$ and the slice position $PS_n$ of each tomographic image obtained by the accessory information analysis unit 71. A specific example of region length calculation method will be described with reference to example region recognition results with respect to ten slices shown in FIG. 10. In FIG. 10, a midpoint $PN_1$ between the slice position $PS_2$ of the slice 2 first recognized as chest and the slice position $PS_1$ of slice 1 lastly recognized as neck which forms a boundary between different regions with the slice 2 is obtained, then a midpoint $PN_2$ between the slice position $PS_9$ of slice 9 lastly recognized as chest and slice position $PS_{10}$ of the slice 10 first recognized as chest which forms a boundary between different regions with the slice 9 is obtained, which yields a region length $X_c$ of the chest as the length between $PN_1$ and $PN_2$. If there is no gap between slices, the region length $X_p$ may be obtained by calculating a total thickness of the slices. The calculation of the region length $X_p$ is performed only for a region which is entirely included in the tomographic images $SL_n$. More specifically, regions recognized in the first and last tomographic images $SL_n$ are excluded from the region length calculation.

With a region p whose region length is calculated by the region length calculation unit 72 as a search key, the standard region length obtaining unit 73 refers to the standard region length table 23 and obtains a range of standard lengths (standard length range) $XS_p$ of the region p of the search key. FIG. 11 illustrates an example of the standard region length table 23. As illustrated, a minimum value $XS_p$ (min) and a maximum value (max) of standard lengths of each region are defined. The standard region length obtaining unit 73 may use a region included in the region recognition result $P_n$ as the search key.

With respect to each region whose region length is calculated by the region length calculation unit 72, the judging unit 74 judges whether or not the calculated region length $X_p$ is included in the corresponding standard region length range $XS_p$ obtained by the standard region length obtaining unit 73. More specifically, judgment is made as to whether or not the region length $X_p$ satisfies $XS_p(\min) \leq X_p \leq XS_p(\max)$, and the judgment result (OK/NG) is outputted.

Figure 12:
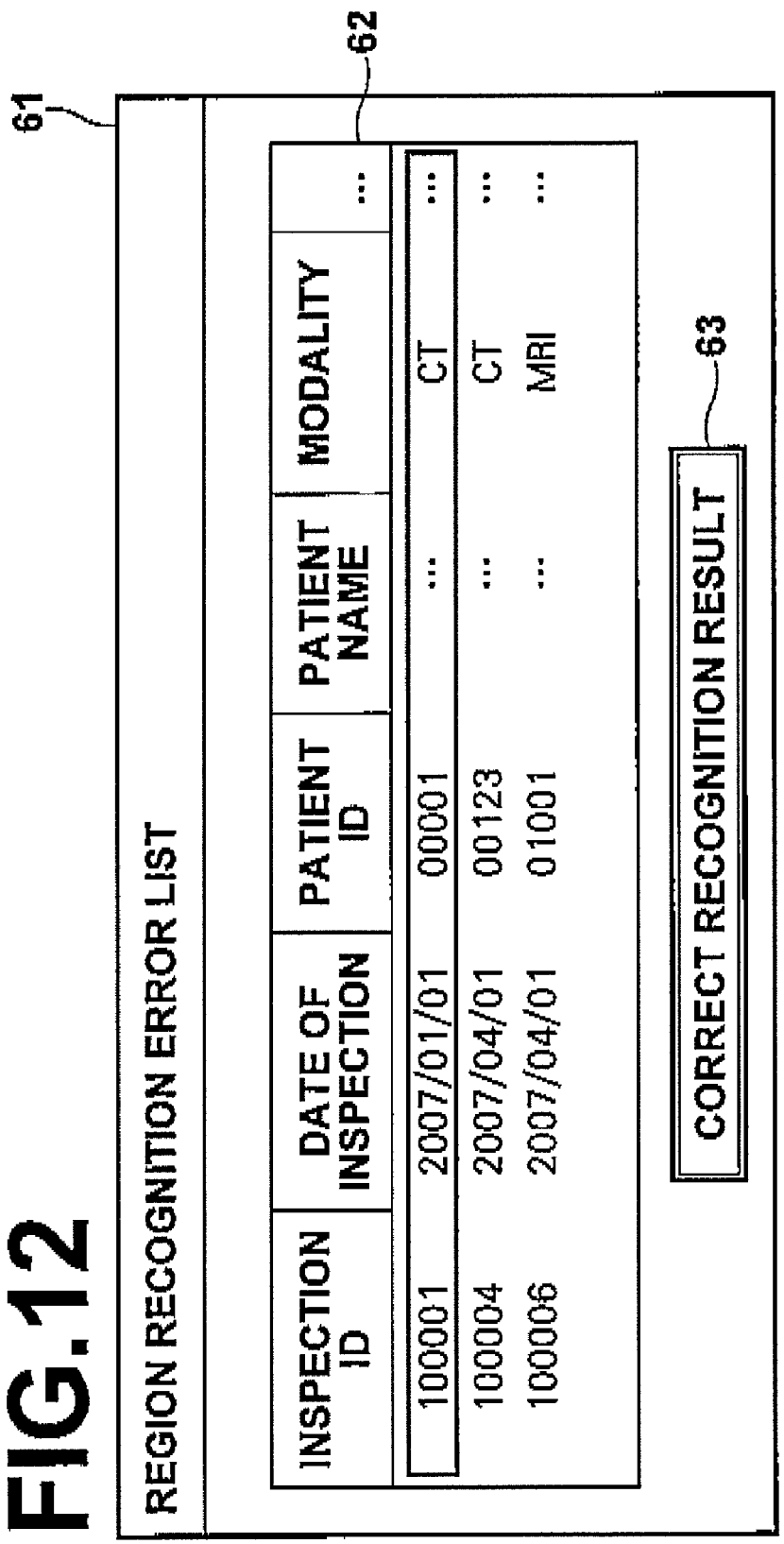
FIG. 12 illustrates an example of structure recognition error list screen.
Figure 13:
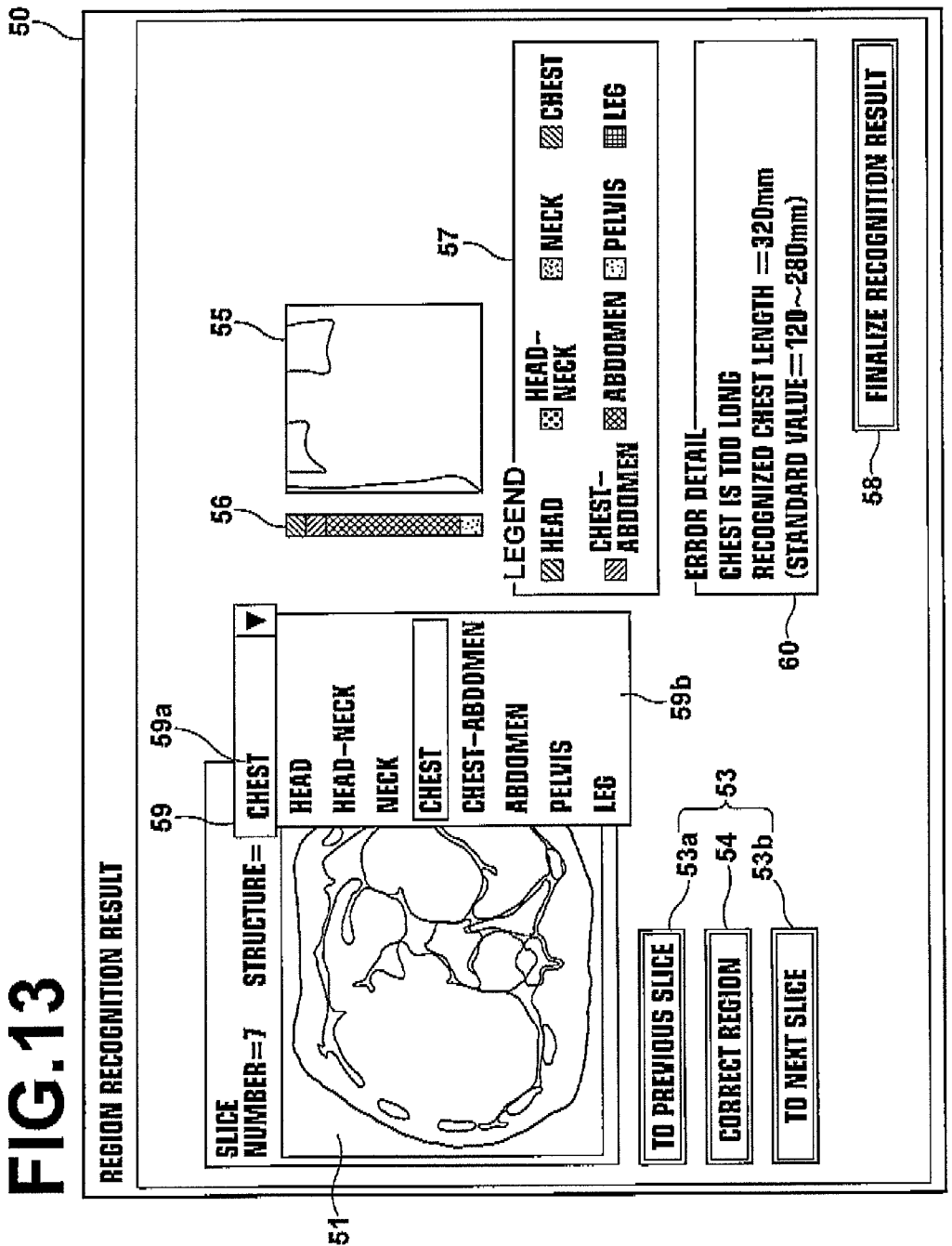
FIG. 13 illustrates an example of structure recognition result screen according to the first embodiment of the present invention.

The region correction unit 24 is a processing unit implemented in the recognition result correction terminal 5 and, as a result of the judgment results made by the recognition result judging unit 22, if at least one of the regions $P_n$ in the inputted tomographic images $SL_n$ is not within the standard region length range, provides a user interface for correcting the region recognition results $P_n$ of the tomographic images $SL_n$. FIGS. 12 and 13 illustrate examples of such user interfaces.

FIG. 12 illustrates an example of region recognition error list screen 61 displaying a list of correction target tomographic images $SL_n$. As illustrated, the region recognition error list screen 61 includes a list area 62 where correction target tomographic images $SL_n$ are listed with respect to each imaging series, and a recognition result correction button 63 for invoking a region recognition result screen (FIG. 13) for actually performing a correction operation. The user selects one of the correction target tomographic images displayed in the list area 62 of the region recognition error list screen 61 (by clicking the mouse of the recognition result correction terminal 5) and depresses the recognition result correction button 63 (clicks the button or the like). This causes the region recognition result screen of the selected correction target tomographic images $SL_n$, is displayed. Here, an arrangement may be adopted in which, when selecting the correction target tomographic images $SL_n$, from the list area 62, the region recognition result screen of the tomographic images is displayed by double clicking the tomographic images $SL_n$.

FIG. 13 is an example of region recognition result screen. As illustrated, the region recognition result screen 50 includes an area 51 where each of the correction target tomographic images $SL_n$, is displayed, a slice switching button 53 for switching display of the tomographic images $SL_n$, (previous slice switching button 53a, next slice switching button 53b), a region correction button 54 for finalizing correction of the region for the tomographic image $SL_n$ displayed in the area 51, an area 55 where a coronal section image CP through obtained by reconstructing a plurality of tomographic images $SL_n$ using a MPR method is displayed, a color bar 56 for displaying a region recognition result $P_n$ in different color at each position of the cross-sectional image CP in the perpendicular direction, that is, at each of slice positions of the tomographic images $SL_n$, and a legend 57 for explaining a region of each region in the color bar 56, a recognition result finalization button 58 for finalizing region recognition results $P_n'$ of all of the tomographic images $SL_n$, a list box 59 for displaying the recognition result $P_n$ of the tomographic image $SL_n$, displayed in the area 51 and correction candidate regions, and an area 60 for displaying a detailed error message. In the region recognition result screen 50, the user confirms the error message of region recognition processing displayed in the area 60. The error message is conveyed from the recognition result judging unit 22, for example, in the form of an error code, and the region correction unit 24 refers to, for example, a table associating error codes with text messages or the like to obtain a text ("chest length is too long" in FIG. 13) corresponding to the error code and displays the text in the area 60. Further, the region length $X_c$ of the chest judged as an error and standard region length range $XS_p$ (min) and $XS_p$ (max) of chest from the recognition result judging unit 22, and these data are also complied like "recognized chest length=320 mm ($X_c$=320 mm here), "standard values=120 to 280 mm" ($XS_p$(min)=120 mm and $XS_p$(max) =280 mm here) based on an error text template of the region correction unit 24 and displayed in the area 60. The user may individually confirm the intended tomographic image ($SL_{N1}$) (area 51) and the recognition result $P_{N1}$ (box portion of the list box section 59a of the list box 59), and at the same time may globally confirm the recognition result at each position in the perpendicular direction of the plurality of tomographic images $SL_n$, by the coronal section image CP (area 55) obtained by and the color bar 56. The user may switch and display each of the tomographic images $SL_n$, by depressing (clicking) the slice switching button 53 using the mouse or the like of the recognition result correction terminal 5. The switching and displaying of the tomographic images may be performed automatically at a predetermined time interval. The reconstructed image may be a sagittal section image.

Further, the user confirms the region recognition result displayed in the box section 59g of the list box 59 while switching the tomographic images $SL_n$, displayed in the area 51 by depressing the slice switching button 53 to display a correction target tomographic image ($SL_{N2}$) and depresses the arrow of the box section 59a of the list box 59. This causes the list section 59b of the list box 59 to be displayed, and the user selects (clicks) a correct region name of the displayed tomographic image from the region names displayed in the list section 59b. Then, when the user depresses the region correction button 54, the recognition result (region) of the tomographic image $SL_{n2}$ displayed in the area 51 at that time is changed and finalized to the region selected in the list box 59. The user interface described above is for illustration purpose only, and other user interfaces may be employed, for example, a user interface in which buttons representing respective regions are displayed on the screen and a correct region name is obtained by depressing a pertinent button. When correction of all regions of the tomographic images to be corrected is completed, the user depresses the recognition result finalization button 58. This causes the region correction section 24 to record the corrected region recognition results $P_n'$ in the accessory information of the tomographic images $SL_n$.

The database registration unit 31 is a processing unit implemented in the image information management server 3, and registers each of a plurality of tomographic images in the image information database 4 by attaching the corresponding final region recognition results. When registered, the tomographic images may be divided into each region.

Figure 14:
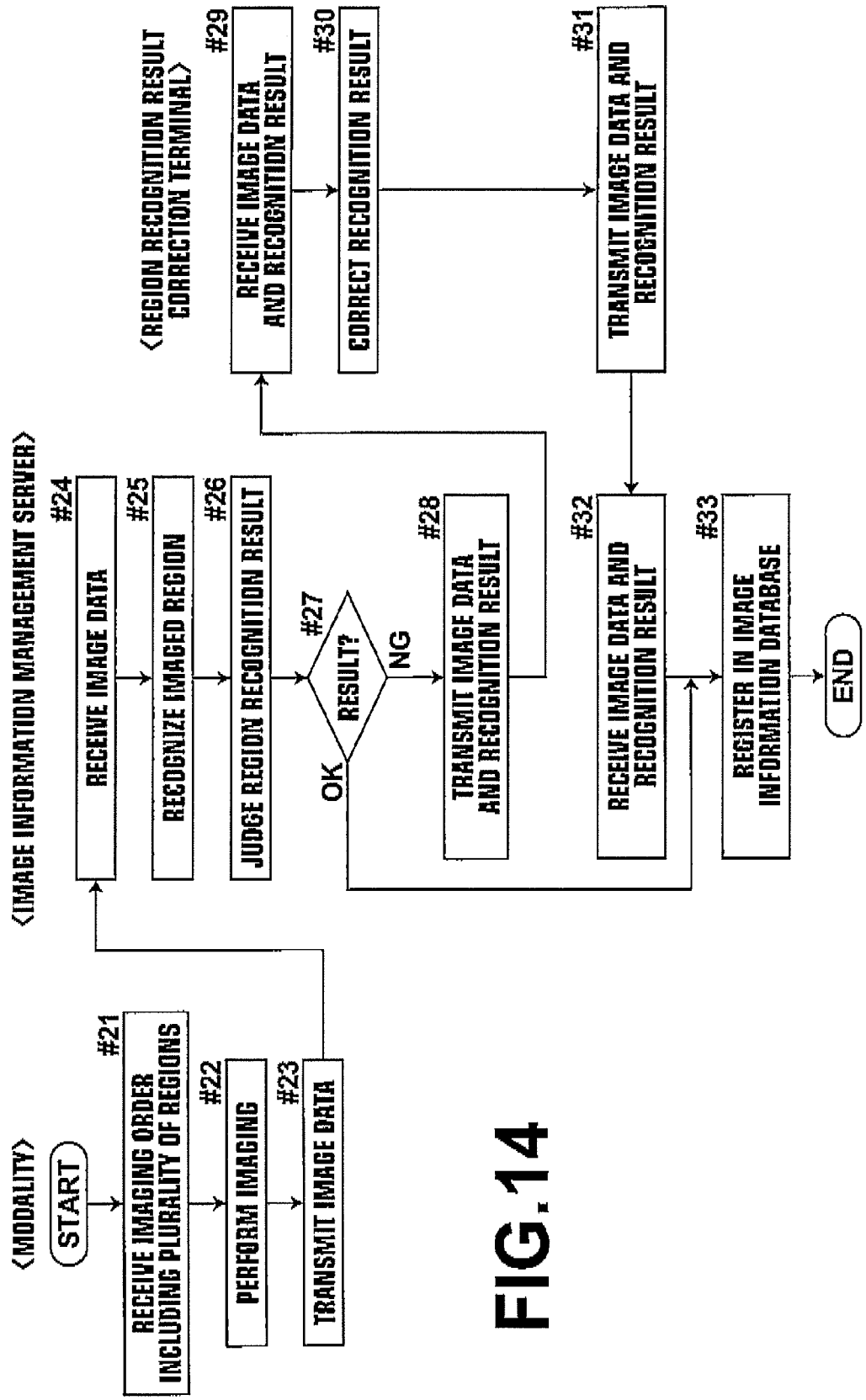
FIG. 14 is a flowchart illustrating an example workflow including the structure recognition result correction processing according to the first embodiment of the present invention

Next, a workflow of image recognition result correction processing of the present invention will be described with reference to the flowchart of FIG. 14, the block diagram of FIG. 4, and the like.

First, an imaging order including a plurality of imaging regions is received in an imaging room where the modality 1 is installed (#21), and imaging of the subject is performed based on the imaging order using the modality 1 to obtain a plurality of tomographic images $SL_n$ (n=1, 2, - - - ) (#22). Then, the image data of the plurality of tomographic images are transmitted to the image information management server 3 (#23). The imaging order may be a consolidated order of two or more orders of a single region.

Next, the image information management server 3 receives the image data of the plurality of tomographic images $SL_n$, transmitted from the modality 1 (#24), and the region recognition unit 21 performs the processing for recognizing a region represented by each of the plurality of tomographic images $SL_n$, to obtain region recognition results $P_n$ (#25). The recognition result judging unit 22 judges the recognition results based on the plurality of tomographic images $SL_n$ (including the accessory information) (#26). As a result of the judgment, if the recognition results are determined to have an error (#27: NG), the image information management server 3 records the recognition results $P_n$ as the accessory information of the tomographic images $SL_n$, and transmits these data ($SL_n$, $P_n$) to the recognition result correction terminal 5 (#28).

The region recognition result correction terminal 5 receives the data ($SL_n$, $P_n$) from the image information management server 3 (#29), and registers the received data in the error list (FIG. 12). Then, it accepts a correction of the region recognition results from the user in the region correction unit 24, and corrected region recognition results $P_n'$ are recorded in the accessory information of the tomographic images $SL_n$, (#30). The region recognition result correction terminal 5 transmits the corrected data ($SL_n$, $P_n'$) to the image information management server 3 (#31).

The image information management server 3 receives the data ($SL_n$, $P_n'$) from the region recognition result correction terminal 5, and the database registration unit 32 registers the data in the image information database 4 (#33).

As described above, in the medical information system including the region recognition result correction apparatus according to the first embodiment of the present invention, the region recognition unit 21 provisionally recognizes a region represented by each of a plurality of tomographic images SLn representing a plurality of regions based on a characteristic of content of each tomographic image (normalization processing unit 41, characteristic amount calculation unit 42, and region score calculation unit 43), and the region determination unit corrects a region provisionally recognized such that the positional relation between provisionally recognized regions with respect to the tomographic images matches with the anatomical positional relation of the subject, thereby the region $P_n$ represented by each of the tomographic images $SL_n$ is determined. For example, when a subject is a human body, this eliminates anatomical positional mismatching in which, for example, head is recognized in a tomographic image located below a tomographic image recognized as chest, so that region recognition accuracy is improved.

Further, when a length of each region recognized in the region recognition unit 21 is judged outside of a standard region length range in the recognition result judging unit 22, the region correction unit 24 of the recognition result correction terminal 5 causes the region length outside of the range and standard region length range to be displayed on the display as the message indicating that the recognition results made by the region recognition unit 21 are incorrect, so that user may easily understand error contents of the region recognition results.

Further, the recognition result judging unit 22 judges whether or not the length of each region determined by the region recognition unit 21 is within a predetermined length range obtained from the standard region length table 23, and if the length is determined to be outside of the predetermined length range, the region is corrected in the region correction unit 24, so that it is possible to discover a region recognition error from the viewpoint of validity of the length of a region extending to a plurality of tomographic images and more accurate region recognition results may be obtained.

In particular, the region recognition unit 21 performs region recognition using discriminators obtained by AdaBoost which is one of the machine learning methods, so that the recognition process is blackboxed and recognition accuracy with respect to each processing target image is unpredictable, but the recognition result judging unit 22 judges whether or not the length of each region is within the standard region length range after the region recognition processing. This allows automatic detection of an unpredictable recognition error, so that burden reduction effects in appropriateness checking of the recognition results manually performed by the user is significant.

In the embodiment described above, the standard region length table 23 includes a minimum value $XS_p$ (min) and a maximum value $XS_p$ (max) of standard length of each region. Alternatively, the table may include a minimum value $RS_p$ (min) and a maximum value $RS_p$ (max) of the ratio of each region to the body height, as illustrated in FIG. 15. In this case, a judging unit 74 judges whether or not the ratio of region length of each of a plurality of regions calculated by a region length calculation unit 72 is within the range from the minimum value and maximum value of the region. For example, when a region length $X_C$ of chest and a region length $X_{CA}$ of chest-abdomen are obtained by the region length calculation unit 72, a standard region length obtaining unit 73 obtains a chest standard region length range $XS_C$ and a chest-abdomen standard region length range $XS_{CA}$, and the judging unit 74 judges whether or not the ratio of chest region length to the chest-abdomen region length $X_C/X_{CA}$ satisfies $X_{SC}$(min)/$X_{SC}$(max)$\leq X_C/X_{CA} \leq X_{SC}$(max)/$XS_{CA}$(min).

Next, second and third embodiments of the region recognition result correction processing of the present invention will be described focusing on the difference from the first embodiment. These embodiments differ from the first embodiment only in the processing of the recognition result judging unit 22, and others are identical to those of the first embodiment.

In the region recognition result correction apparatus according to the second embodiment of the present invention, it is assumed that the length of each region follows a predetermined probability distribution, and a reliability level in the probability distribution is obtained, then a reliability range in the probability distribution is obtained based on the obtained reliability level, and judgment of recognition result is made with the reliability range as a predetermined length range.

Figure 16:
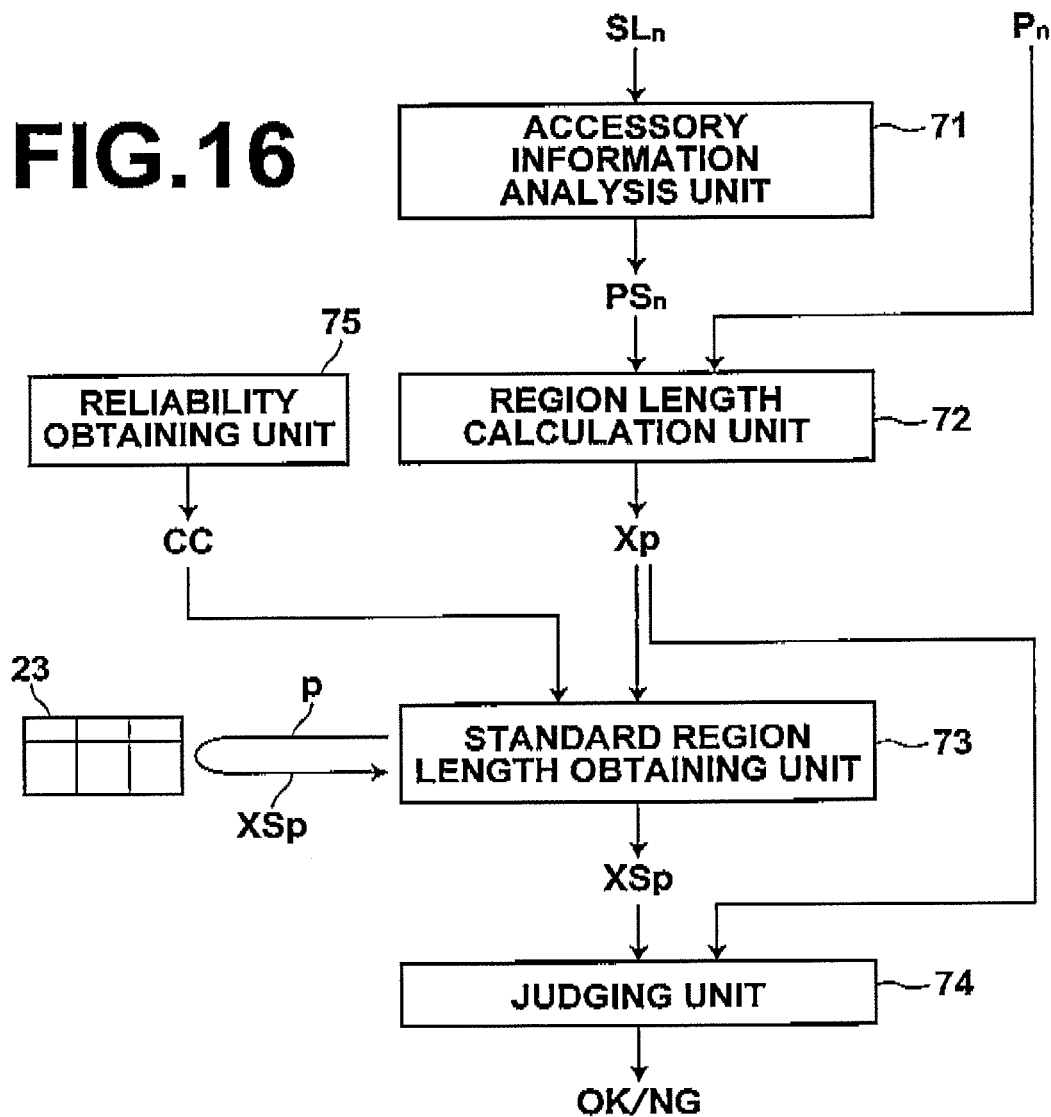
FIG. 16 is a block diagram of the recognition result judging unit according to a second embodiment of the present invention, schematically illustrating the configuration thereof.

FIG. 16 is a block diagram of the recognition result judging unit 22 according to the present embodiment, illustrating the processing thereof in detail. As illustrated, the recognition result judging unit 22 additionally includes a reliability level obtaining unit 75 in comparison with the configuration shown in FIG. 9. Further, processing of the standard region length obtaining unit 73 and construction of the standard region length table 23 are different in comparison with the first embodiment in the following way.

The reliability level obtaining unit 75 obtains a reliability level cc which is given as a parameter when the program that performs the processing is activated. It is noted that the reliability level obtaining unit 75 may include a user interface for accepting input of the reliability level cc and obtain the reliability level cc through user input or by a certain calculation method.

FIG. 17 illustrates an example of standard region length table 23 according to the present embodiment. As illustrated, the table defines an average value $\mu_p$ of region lengths of each region and a standard deviation $\sigma_p$ thereof on the assumption that region length distribution follows normal distribution.

The standard region length obtaining unit 73 refers to the standard region length table 23 with a region whose region length is calculated by the region length calculation unit 72 as the search key, as in the first embodiment, and obtains the average value $\mu_p$ and standard deviation $\sigma_p$. Then, the standard region length obtaining unit 73 refers to reference data representing a normal distribution table with a reliability level cc obtained by the reliability level obtaining unit 75 as the reference key to obtain a standard score z corresponding to the reliability level cc, and calculates a reliability range, that is, the standard region length range $XS_p$ of the region p from the standard score z, and the region length average value $\mu_p$ and standard deviation $\sigma_p$ obtained from the standard region length table 23. The standard region length range $XS_p$ can be expressed by Formulae (1) and (2) shown below.

$$XS_p(\min) = -z \cdot \sigma_p + \mu_p \qquad (1)$$

$$XS_p(\max) = z \cdot \sigma_p + \mu_p \qquad (2)$$

For example, where the reliability level cc is 95% and the region p is chest-abdomen, then the standard region length range $XS_C$ becomes the following.

$$XS_C(\min) = -1.96 \times 25 + 70 = 21 \text{ mm}$$

$$XS_C(\max) = 1.96 \times 25 + 70 = 119 \text{ mm}$$

In this case, the probability that the length of the chest-abdomen of a subject falls within the range from 21 to 119 mm is 95%. Detailed processing in other units and the workflow of the region recognition result correction processing of the present invention are identical to those of the first embodiment.

As described above, in the medical information system incorporating the region recognition result correction apparatus according to the second embodiment, it is assumed that the length of each region follows normal distribution, and a reliability level cc in the normal distribution is obtained by the reliability level obtaining unit 75, then a reliability range is obtained by the standard region length obtaining unit 73 based on the reliability level cc in addition to the region length average value $\mu_p$ and standard deviation $\sigma_p$ obtained from the standard region length table 23, and judgments of region recognition result is made by the judging unit 74 with the reliability range as the standard region length range $XS_p$ in the recognition result judging unit 22. This allows the judgment standard to be set finely according to the reliability level, thereby more accurate region recognition results may be obtained.

In the region recognition result correction apparatus according to the third embodiment of the present invention, attribute information representing an attribute of a subject is obtained, then a length range is predetermined according to the obtained attribute information, and judgment of recognition results is made using the predetermined length range.

FIG. 18 is a block diagram of the recognition result judging unit 22 according to the present embodiment, schematically illustrating the detailed processing thereof. As illustrated, the processing of the accessory information analysis unit 71 and the standard region length obtaining unit 73 differs from that of those shown in FIG. 9, in addition to the construction of the standard region length table 23 in the following way.

The accessory information analysis unit 71 obtains body height information Bh as well as analyzing inputted tomographic images $SL_n$ and obtaining a slice position $PS_n$ of each of the tomographic images.

FIGS. 19A, 19B, and 19C illustrate an example of standard region length table 23 according to the present embodiment. As illustrated, the standard region length table 23 includes, for example, a sub-table that defines the standard region length range for body heights from 140 to less than 160 cm (FIG. 19A), a sub-table that defines the standard region length range for body heights from 160 to less than 180 cm (FIG. 19B), and a sub-table that defines the standard region length range for body heights from 180 to less than 200 cm (FIG. 19C) to define the standard region length range with respect to each of body height ranges of subjects. It is noted that an identical sub-table may be provided for body heights not included in the three sub-tables described above.

The standard region length obtaining unit 73 refers to the standard region length table 23 with a body height Bh of a subject obtained by the accessory information analysis unit 71 and a region p whose region length is calculated by the region length calculation unit 72 as search keys. This results in that the standard region length range $XS_p$ corresponding to the region p of the search key to be obtained from one of a plurality of sub-tables exemplary shown in FIGS. 19A, 19B and 19C corresponding to the body height Bh of the subject. Detailed processing in other units and the workflow of the region recognition result correction processing of the present invention are identical to those of the first embodiment.

As described above, in the medical information system incorporating the region recognition result correction apparatus according to the third embodiment, attribute information representing a body height of a subject is obtained by the accessory information analysis unit 71, then the standard region length range is determined by the standard region length obtaining unit 73 by referring to the standard region length table 73 in which a standard region length range is defined with respect to each body height range and each region of subjects, and judgment of region recognition results is made by the judging unit 74 using the determined standard region length range $XS_p$ in the recognition result judging unit 22. This allows the judgment standard to be set finely according to body heights of subjects, thereby more accurate region recognition results may be obtained.

In the embodiment described above, the standard region length table 23 includes a plurality of sub-tables with respect to the respective body height ranges of subjects, but the body height ranges may be incorporated as an item (column) in one table. Otherwise, an arrangement may be adopted in which, as shown in FIG. 20, the standard region length table 23 defines standard region length ranges $(XS_{p0})$ of the respective regions only for a standard body height $Bh_0$ (170 cm in FIG. 20), then with a region p whose region length is calculated by the region length calculation unit 72 as the key, the standard region length $XS_{p0}$ corresponding to the region p is obtained by the standard region length obtaining unit 73 from the standard region length table 23, and the standard region length range $XS_p$ of the subject is obtained by converting the standard region length range based on the ratio between the body height Bh of the subject and the standard body height $Bh_0$. More specifically, a minimum value $XS_p$ (min) and a maximum value $XS_p$ (max) of a standard region length are obtained by Formulae (3) and (4) below.

$$XS_p(\min)=XS_{p0}(\min)\cdot(Bh/Bh_0) \tag{3}$$

$$XS_p(\max)=XS_{p0}(\max)\cdot(Bh/Bh_0) \tag{4}$$

Here, $XS_{p0}$ (min) and $XS_{p0}$ (max) are a minimum value and a maximum value at the standard body height $Bh_0$ respectively.

Further, in the embodiment described above, the standard region length range is obtained according to the body height of a subject. But, an arrangement may be adopted in which other attributes of a subject, such as the gender, age, country of residence, race group, occupation, and the like are obtained by the accessory information analysis unit 71, and the standard region length range is obtained according to these attributes. Still further, attributes of a subject (e.g., respiratory phase cycle (respiratory state) such as maximal expiration and maximal inspiration) may be obtained by performing known image analysis processing on the tomographic images $SL_n$, or otherwise attributes of a subject may be obtained by accepting user input. Further, a plurality of attributes of a subject may be combined and standard region length range of each region may be defined with respect to each combination. For example, the standard region length table 23 may include 16 sub-tables, each defining the standard region length range of each region, provided based on 16 patterns in combination of two categories of gender and eight categories of age.

Further, the standard region length table and recognition result judging unit may be formed by combining a plurality of embodiments described above. More specifically, a table that defines an average value of region lengths and variance of each region like that shown in FIG. 17 may be divided into sub-tables with respect to each body height range like those shown in FIGS. 19A, 19B, and 19C.

Still further, an arrangement may be adopted in which a standard region length is obtained by a function which outputs a standard region length when a region name or a body height of a subject is inputted, instead of using the reference table.

3. Implementation Example of Rib Recognition Processing

Embodiments 4 to 6

Hereinafter, where rib recognition processing is performed by the system described under Paragraph 1 above will be described as embodiments 4 to 6.

In the embodiments, rib recognition processing is implemented in the image recognition unit 11 shown in FIG. 2, which receives image data Img of a three-dimensional image obtained by the modality 1, such as CT, MRI or the like, recognizes each of the ribs of a subject in the image, and outputs information of recognized rib area as rib recognition results Rst. In certain embodiments, recognition of rib number of each recognized rib is also performed.

Hereinafter, processing for extracting a sternum area where a sternum is imaged and rib areas from a three-dimensional image Img including a plurality of axial section images, and determining rib numbers from a position corresponding to the lower end portion of the sternum of the sternum area and a position of each rib area will be described by referring to the method proposed by the applicant of the present invention in Japanese Patent Application No. 2008-092173.

Figure 21:
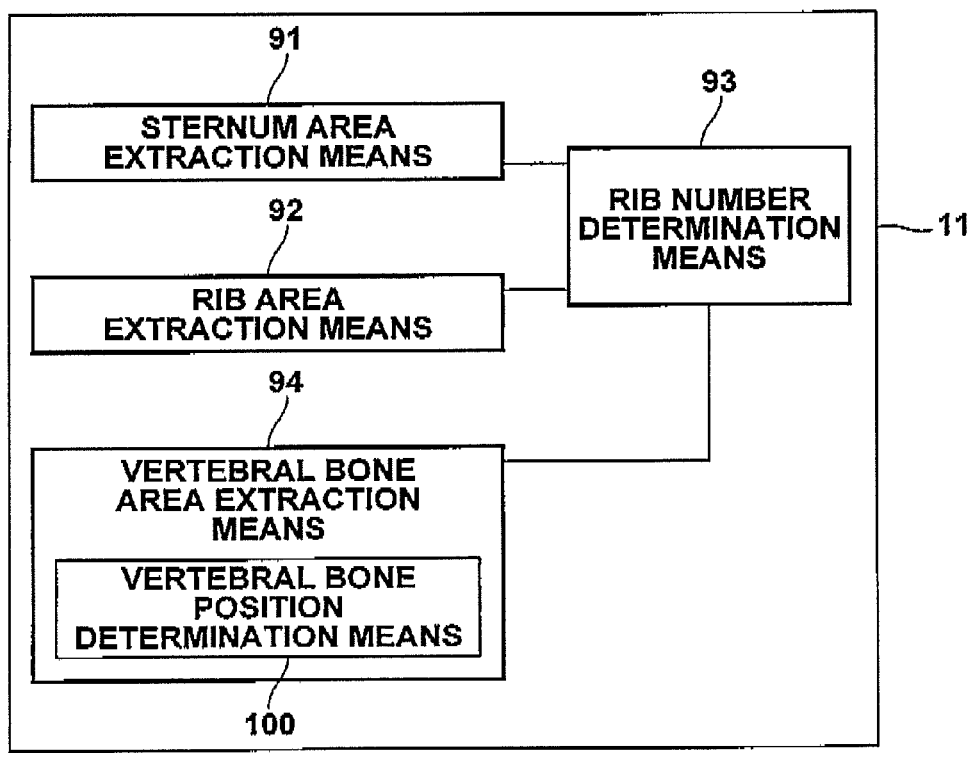
FIG. 21 is a block diagram of an image recognition unit for recognizing rib and rib number illustrating the configuration thereof.

FIG. 21 is a block diagram of the image recognition unit 11 that performs rib and rib number recognition, illustrating the configuration thereof. As illustrated, the image recognition unit 11 includes a sternum area extraction means 91 for extracting a sternum area with a three-dimensional image data Img as input, a rib area extraction means 92 for extracting a rib area, a rib number determination means 93 for determining the rib number of each rib area from a position of the sternum area and a position of each rib area, and a vertebral bone area extraction means 94 for extracting a vertebral area.

The vertebral bone area extraction means 94 includes a vertebral bone position determination means 100, and extracts a vertebral bone area which is a vertebral column separated into each vertebral bone from an end portion of the vertebral body using information of a position of a segmented end portion of the vertebral body determined by the vertebral bone position determination means 100.

Figure 22:
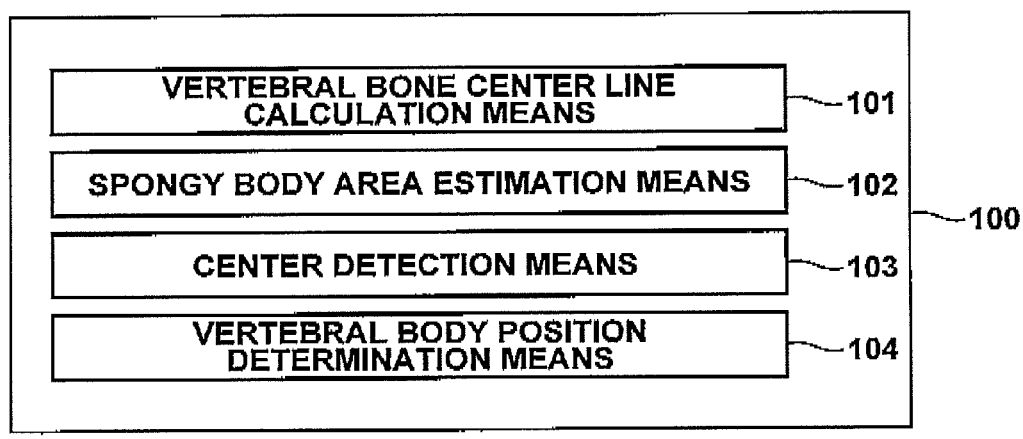
FIG. 22 is a schematic configuration diagram of vertebral body position determining means.

The vertebral bone position determination means 100 is a means that automatically calculates both end portions of a vertebral body imaged in a tomographic image obtained, for example, by CT equipment. The vertebral bone position determination means 100 includes a vertebral bone center line calculation means 101, a spongy body area estimation means 102, a center detection means 103, and a vertebral body position determination means 104 as shown in FIG. 22.

The vertebral bone center line calculation means 101 obtains a center line of a vertebral bone from a plurality of tomographic images representing a cross-section of the vertebral bone.

Figure 23:
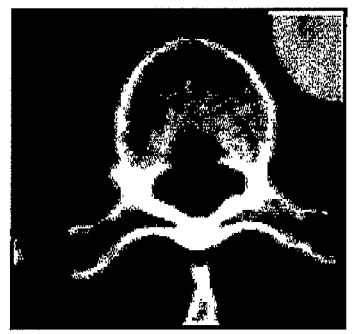
FIG. 23 illustrates an example of vertebral bone imaged in a tomographic image.

First, a spinal cord area is extracted from a three-dimensional image Img. The spinal cord area appears in a typical pattern on a tomographic image as shown in FIG. 23, so that it is possible to stably detect the spinal cord area from the tomographic image. More specifically, for example, multitudes of areas having a predetermined size centered on each pixel are set, and each area is determined whether or not to be a spinal cord area using a discriminator generated by a machine learning method, thereby the spinal area is detected.

Next, a spinal cord center line is generated from center points within a plurality of detected spinal cord areas. Here, a pixel located substantially in the center of the spinal cord area is set as the center point. It is not necessarily the strict center within the spinal cord area, and may be a point located equidistance from the periphery or predetermined two ends of the spinal cord area, or a gravity point thereof.

Figure 24:
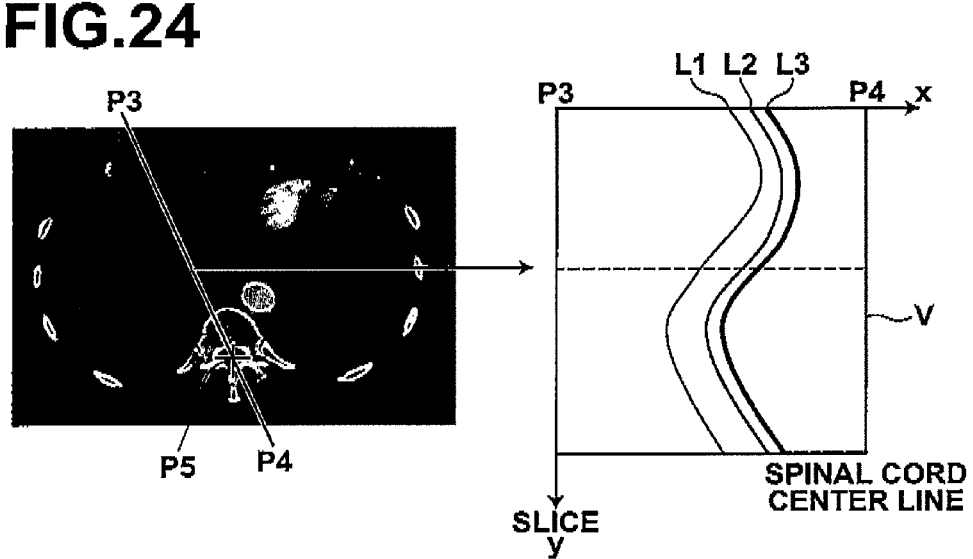
FIG. 24 illustrates how to calculate spinal cord axis.

Then, a vertical section image which is re-sectioned tomographic images in the body axis direction along the spinal code center line is generated. As illustrated in FIG. 24, a luminance value of each pixel on the straight line connecting points P3 and P4 inclined by $\alpha$ degrees in the counter-clockwise direction from Y axis with reference to the center point P5 of the spinal cord area obtained from each tomographic image, and luminance values on the straight line connecting the points P3 and P4 extracted from each tomographic image (corresponding to x axis direction of the drawing on the right side) are stacked in the order of the slice number of the tomographic images (corresponding to the y axis direction of the drawing on the right side), thereby a vertical section image V is generated. The heart area includes many blood vessels and the like, so that a stable pattern can not be obtained. Therefore, it is preferable that the straight line connecting the points P3 and P4 is set to pass the center point and spine area but not the hear area.

Figure 25:
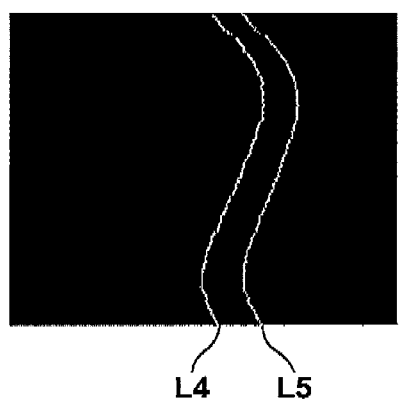
FIG. 25 illustrates how to calculate left and right boundary lines of vertebral bone.

Then, a boundary line of the vertebral bone is detected from the vertical section image V. A spinal cord center line L3 appears as a curved line on the vertical section image, and the spinal area appears on the left side of the spinal cord center line as two trabecular bone lines with high CT values (pixel values) and a spongy bone area with low CT values (pixel values) enclosed by the two lines. Then, by observing pixel values in the x direction on the vertical section image V, an edge where a large positive difference value appears on the ventral side of the spinal area is obtained, and an edge where a large negative value appears on the dorsal side is obtained. Then, the spinal cord center line L3 is linear transformed to fit into an edge line L2 on the dorsal side and an edge curve L5 is obtained. Likewise, with respect to an edge line L1 on the ventral side, an edge curve L4 is obtained in the same manner. The curved lines L4 and L5 calculated like those in FIG. 25 become left and right boundary lines of the vertebral bones including the spine area. Then, the center line and width of the vertebral bones may be calculated from the calculated left and right boundary lines L4 and L5.

The spongy body estimation means 62 estimates a spongy area using pixels around the area of the vertebral bone center line obtained by the vertebral bone center line obtaining means 101. The imaged three-dimensional image Img may possibly include an affected or deformed portion of a vertebral bone. Therefore, the spongy area can be detected more stably using only the area around the vertebral bone center line, rather than using the entire three-dimensional image Img. In addition, an intervertebra can be obtained more reliably by first extracting a spongy body area which can be extracted relatively stably from an image pattern and obtaining the intervertebral area using the spongy body area, rather than by first extracting the intervertebral area and performing segmentation.

Figure 26:
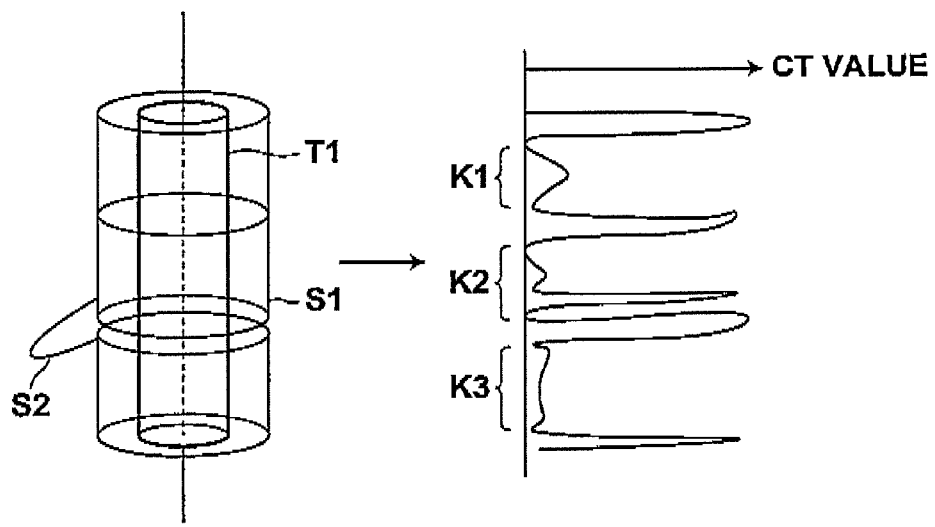
FIG. 26 illustrate how to determine the position of vertebral body.

FIG. 26 conceptually illustrates vertebral bones, vertebral body, and the like. The cylinder S1 shown in FIG. 26 represents the vertebral body and the surface of the cylinder corresponds to the cortex portion of the vertebral body. The top and bottom plates of the cylinder correspond to top and bottom end plates of the vertebral body respectively. The protrusion S2 represents a bone growth area. The cylinder portion T1 represents an area around the center of the spiral cord.

Here, when CT values (pixel values) of the cylinder portion T1 are added up in the horizontal direction, a graph like that shown on the right side of FIG. 26 can be obtained. Vertebral areas may sometimes disappear on tomographic images due to partial volume effects. But, areas with low CT values (pixel values) corresponding to spongy body areas (e.g., K1 to K3) appear as shown in the graph of FIG. 26. But, a valley of vertebral area may possibly become shallow due to the protrusion S2, that is, bone growth area. Even where a spongy body is crashed and CT values (pixel values) thereof may become high, like a three-dimensional image representing a human body with a serious compression fracture, the spongy body area may be detected by detecting edges in the body axis direction instead of detecting from the added-up value of CT values (pixel values).

Within a spongy body area of each vertebral body estimated by the spongy body area estimation means 102, the center detection means 103 detects a three-dimensional center of the spongy body area. The three-dimensional center of a spongy body area may be obtained by machine learning of a characteristic amount of each of a plurality of sample images including spongy body areas in advance. A score representing likelihood that the spongy body area is included in an area around the vertebral bone center line is calculated from characteristic amounts of pixels around the vertebral bone center line using a machine-learned discriminator, and the three-dimensional center of the spongy body area is detected based on the score.

Based on the three-dimensional center of spongy body area of each vertebral body detected by the spongy body area detection means 63, the vertebral body position determination means 104 determines a vertebral body position by calculating positions of both ends of each vertebral body in the body axis direction. For example, a midpoint between three-dimensional centers of spongy body areas of two adjacent vertebral bodies is determined as the intervertebral area of the two vertebral bones. Another method may also be used, in which a position of the cortex portion of a vertebral bone is detected by detecting a maximum point of total sum of CT values (pixel values) between the three-dimensional centers of spongy body areas of two adjacent vertebral bones, and ends of the vertebral bodies are determined.

The rib area extraction means 92 extracts rib areas of a human body from a three-dimensional image Img by individually separating them.

For example, the method described in U.S. Patent Application Publication No. 20060062425 (Reference Document 1) may be used. The Reference Document 1 discloses a technology based on high-speed tracing for extracting rib areas from a three-dimensional image Img. This technology may be used for extracting ribs and obtaining a rib area representing each rib.

Figure 27:
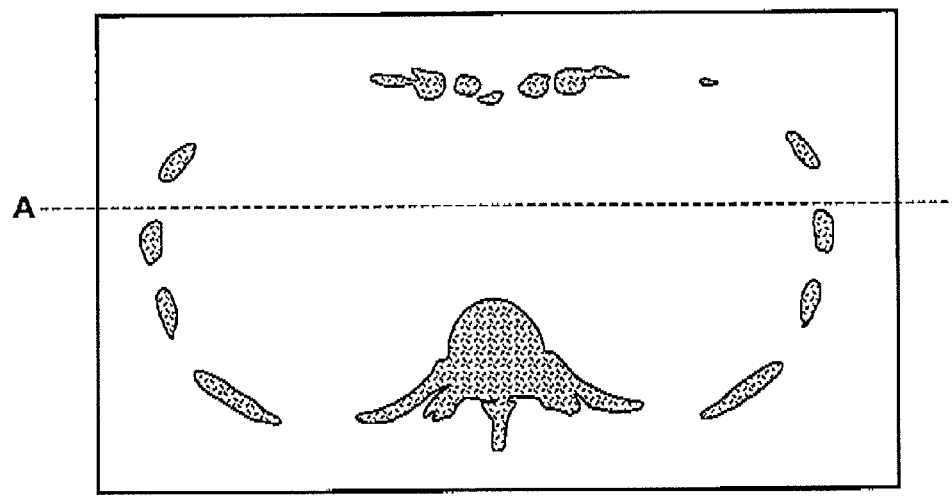
FIG. 27 illustrates an example of tomographic image of vertebral bone and rib portions.

Alternatively, a rib area may be detected using a density histogram of rib areas. FIG. 27 illustrates a tomographic image representing a vertebral body and rib portions. First, the center line and lateral width of the vertebral body are obtained. For this purpose, bone areas of those shown in FIG. 27 located lower than a center line A in the lateral direction of the body surface (that is, a line in the left-right direction of the body which is orthogonal to the anterior-posterior direction of the body at the center thereof on a cross section orthogonal to the direction of the body axis connecting the head and foot are projected in the vertical axis to generate a density histogram.

Figure 28:
FIG. 28 illustrates a density histogram of bone portion.

FIG. 28 illustrates a density histogram generated in the manner as described above. In the histogram shown in FIG. 28, a large peak is observed in the center, and small peaks are formed on the left and right sides thereof. In the tomographic image shown in FIG. 17, it is thought that the rib portions form the small peaks and the vertebral bone portion, having more bones, forms the largest peak. Thus, the maximum peak located in the center is detected from the histogram of FIG. 28, and the corresponding portion thereof is detected as the vertebral bone area.

Figure 29:
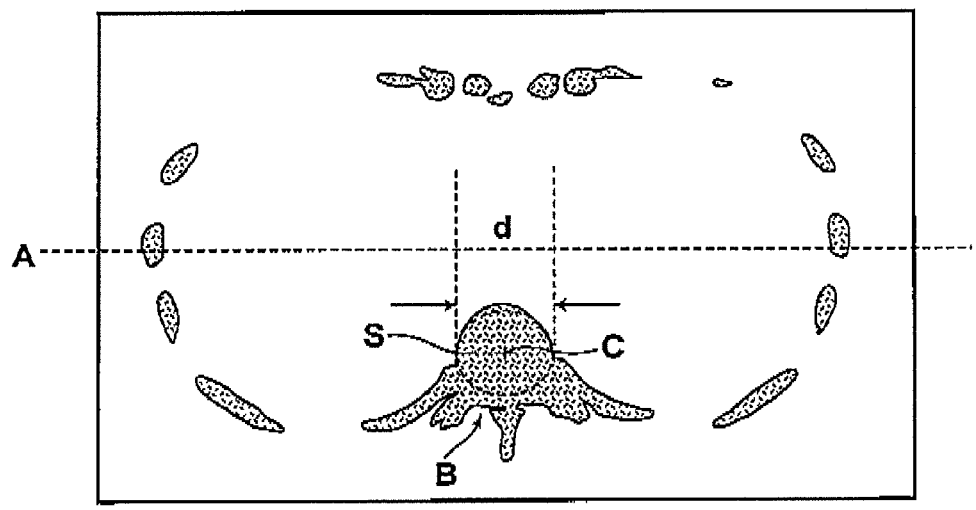
FIG. 29 illustrates the center and width of vertebral bone.

Then, as illustrated in FIG. 29, a circle S is applied to the detected vertebral bone area B to obtain the center C and width d of the vertebral bone. Then, the vertebral bone area, rib areas on the left and right thereof, and sternum area are recognized.

Figure 30:
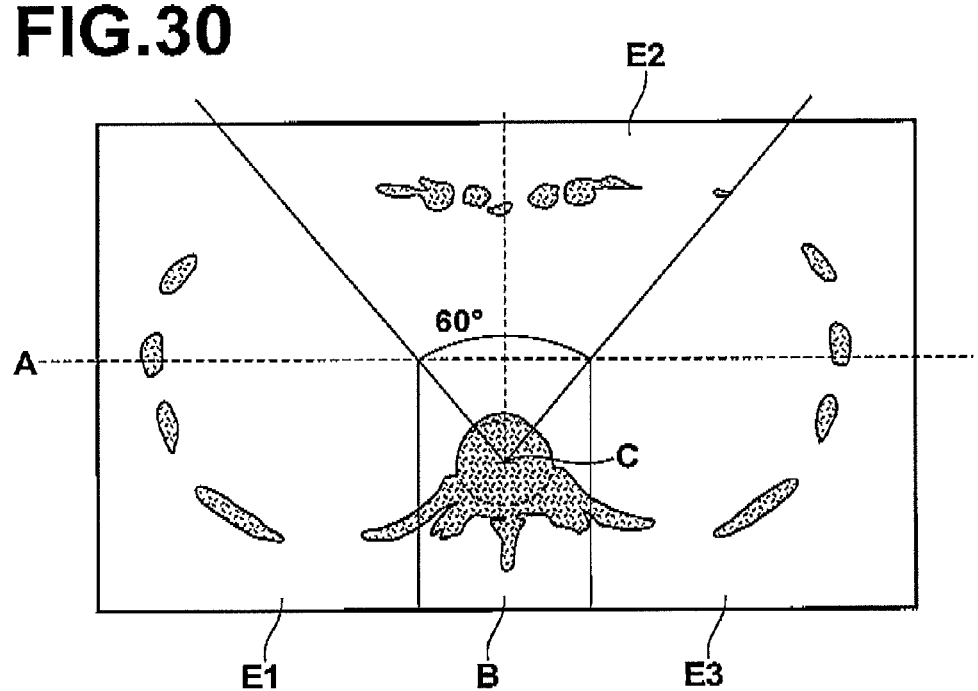
FIG. 30 illustrates a cross-sectional image separated into vertebral bone area, right rib area, breastbone area, and left rib area.

As illustrated in FIG. 30, two half straight lines are drawn upward from the vertebral body center C obtained in the manner as described above at an angle of 60 degrees respectively, and also two straight lines orthogonal to the center line A are drawn such that the vertebral bone center C is included in the center thereof. The distance between the two straight lines is the width of the vertebral bone area, which is set to a value 1.5 times that of the width d. In this way, the bone areas of the tomographic image shown in FIG. 30 are divided into four areas by the two half straight lines and two straight lines orthogonal to the center line A, which are designated as the vertebral bone area B, right rib area E1, sternum area E2, and left rib area E3 respectively. In this way, the bones are recognized on the basis of parts, like the vertebral bone, right ribs, sternum, and left ribs. Each of these parts is recognized for each of the tomographic images of the three-dimensional image Img, and rib areas detected from the respective tomographic images are stacked in the order of the slice number, which are detected as the rib area.

Figure 31:
FIG. 31 illustrates an example of sternum imaged in a tomographic image.

The sternum area extraction means 91 extracts a sternum area from the three-dimensional image Img. As illustrated in FIG. 31, the sternum appears as a rectangular area having a substantially the same size with a lumen (spongy body) on each tomographic image (A portion in FIG. 31), which can be detected by pattern recognition. The sternum appears at a position close to the anterior of the body which is opposite to a position of the vertebral bone appearing on a chest cross-section, so that a rectangular area is detected from each tomographic image near the anterior of the body. Then, the rectangular areas detected from respective tomographic images are stacked in the order of the slice number, which are extracted as the sternum area. As one of the specific methods of extracting the sternum area from each tomographic image, the following method may be cited. That is, the method in which a small area having a predetermined size that can include sternum is sequentially set to the tomographic images, then a characteristic amount, such as a statistic value of density distribution pattern, is calculated in each small area, and the calculated characteristic amount is inputted to a discriminator obtained through learning based on AdaBoost method to determine whether or not each small area is a sternum. Here, the discriminator is obtained by learning based on AdaBoost method using characteristic amounts calculated in the same manner as described above for learning samples including a plurality of images, each known to be representing a sternum and a plurality of images, each known not to be representing a sternum.

Figure 32:
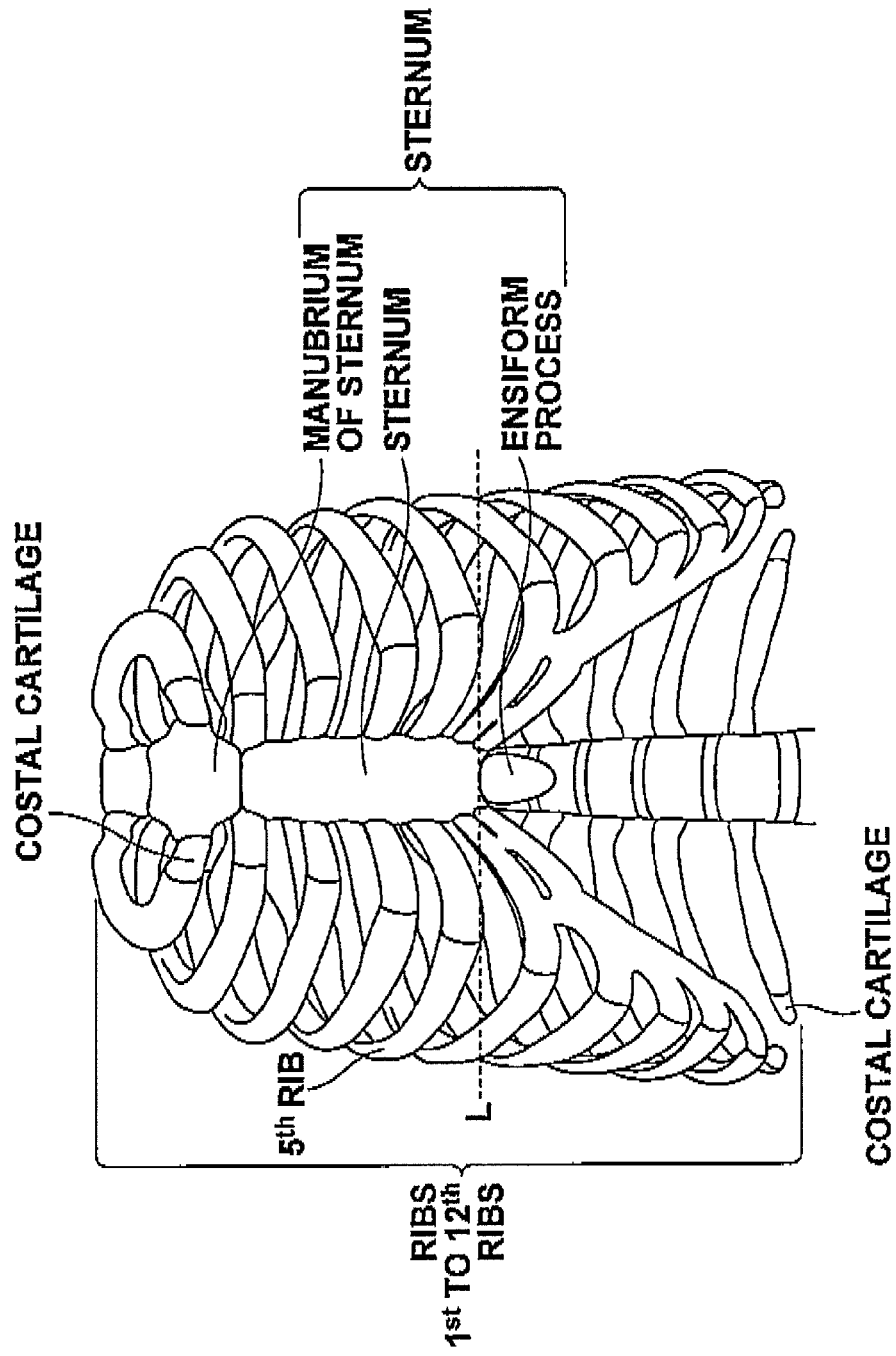
FIG. 32 illustrates connection relation between sternum and ribs.

The rib number determination means 93 determines the rib number according to how a rib area is connected to the sternum area. Anatomically, the second to tenth ribs are connected to the sternum, as illustrated in FIG. 32. Further, substantially the entirety of the first to fifth ribs locates above the bottom end L of the sternum. Accordingly, one of the rib areas connected to the sternum area which locates above the bottom end L of the sternum substantially in its entirety and positioned at the lowest of them can be identified as the fifth rib. Therefore, with reference to the fifth rib, the rib number of each rib area is determined according to the aligned sequence of the rib areas.

Next, a processing flow of the bone number determination apparatus will be described with reference to the flowchart of FIG. 33.

First, the rib area extraction means 92 extracts all rib areas imaged in a three-dimensional image Img (ST100). Next, the vertebral bone extraction means 54 extracts a spinal cord area from the three-dimensional image Img and automatically calculates positions of both ends of the vertebral body to separate the body into each vertebral bone area (ST101).

Then, the number of extracted rib areas is counted (ST102). If the number of rib areas is 12, the $12^{th}$ rib is identified (ST103), and rib numbers are serially allocated to the other rib areas upwardly from 11, 10 - - - to 1 with reference to the $12^{th}$ rib area (ST104).

If the number of rib areas is less than 12, a determination is made as to whether or not the lower backbone is imaged (ST105). If the lower backbone is imaged, then the bottom rib is imaged, so that the bottom rib area is identifies as the $12^{th}$ rib (ST103), and rib numbers are serially allocated to the other rib areas upwardly from 11, 10, - - - with reference to the $12^{th}$ rib area (ST104). If the number of rib areas is less than 12, and the lower backbone is not imaged, a determination is made as to whether or not the neck bone is imaged (ST106). If the neck bone is imaged, the top rib is imaged, so that the top rib area is identified as the $1^{st}$ rib area (ST107), and rib numbers are serially allocated to the other rib areas downwardly from 2, 3 - - - with reference to the $1^{st}$ rib area (ST108).

Where the number of rib areas is less than 12, and neither the lower backbone nor the neck bone is imaged, the sternum area extraction means 91 extracts a sternum area from the three-dimensional image Img (ST109). The rib number determination means 93 determines rib numbers according to how rib areas are connected to the sternum area (ST110).

In the foregoing, a description has been made that rib numbers are identified without recognizing the sternum if all of the 12 rib areas can be recognized, or if the $1^{st}$ or $12^{th}$ rib area can be recognized. But, sternum recognition may be always performed to identify the sternum and the position of the $5^{th}$ rib, and rib numbers of other ribs may be identified.

If judgment is not made according to the rib numbers of individual ribs in the recognition result judging processing that follows, the processing of the rib number determination means 93 is not required.

FIG. 34 is a block diagram of the recognition result judging unit 12 shown in FIG. 2 according to the fourth embodiment of the present invention, illustrating the processing thereof in detail. As illustrated, in the present embodiment, the recognition result judging unit 12 includes an anatomical measurement value obtaining unit 81, a standard value obtaining unit 82, a standard range table 83a, and a judging unit 84, and processing is performed in the following manner.

Based on rib recognition results Rst of the image recognition unit 11, the anatomical measurement value obtaining unit 81 measures a length Ms of each of recognized ribs on the image Img. More specifically, it performs thinning processing on each of the recognized rib areas and measures a length of the core line of each rib area obtained by the thinning processing, which is determined as the length Ms of each rib.

The standard value obtaining unit 82 obtains information Std representing a possible length range of standard ribs from the standard range table 83a. FIGS. 35A and 35B illustrate two examples of the standard range table 83a. FIG. 35A defines a standard length range which is common to 12 ribs on each of left and right sides by minimum and maximum values, and the standard value obtaining unit 82 obtains the minimum and maximum values as the standard length range Std for all ribs recognized by the image recognition unit 11. In this case, it is not necessary to recognize the rib number of each rib in the image recognition unit 11. On the other hand, FIG. 35B defines a standard length range of each of 12 ribs by minimum and maximum values, and the standard value obtaining unit 82 refers to the standard range table 83a with a rib number as a key and obtains the minimum and maximum values corresponding to the rib number as the standard length range Std of the rib having the rib number.

The judging unit 84 judges whether or not the length Ms of each of the ribs obtained by the anatomical measurement value obtaining unit 81 falls within the standard length range Std, and outputs each result (OK/NG). Here, if the standard range table 83a is defined like that shown in FIG. 35A, the length Ms of each rib is compared to the standard length range Std which is common to ribs, while if the standard range table 83a is defined like that shown in FIG. 35B, the Length Ms of each rib is compared to the standard length range Std of the same rib number as that of each rib.

Where the length of at least one of the ribs is judged not to fall within the standard length range by the judging unit 84 of the recognition result judging unit 12, the incorrect recognition result display/correction unit 14 displays the processing target image data Img and incorrect recognition result Rst on a screen with these as input, provides a user interface for accepting correction of the recognition result by the user, and outputs a corrected recognition result Rst'. As for a specific user interface, the following is conceivable. That is, a user interface that reconstructs an image including a rib judged not to fall within the standard length range based on a processing target image data Img, displays the rib in an identifiable manner, for example, by highlighting the contour of the rib in addition to the rib number, measured length, standard length range of the rib in a manner like "The length of the $10^{th}$ rib on the left is outside of the standard length range (from xx to yy mm). The measured length=zz mm.", and allows the user to correct the contour of the rib on the reconstructed image by a mouse operation. It is noted that a list of image data Img judged as rib recognition error may be displayed, as in the region recognition error list screen (FIG. 12) of the first embodiment, and the aforementioned user interface may be provided after accepting a mouse operation or the like for selecting intended image data from the list by the user.

The database registration unit 15 registers the processing target image data Img in the image information database 4 with the recognition results Rst recognized by the image recognition unit 11 or corrected recognition results Rst' attached as accessory information, as described under Paragraph 1 above.

As described above, in the fourth embodiment of the present invention, it is possible that the recognition result judging unit 12 automatically judges whether or not the length Ms of each of the ribs recognized by the rib recognition processing of the image recognition unit 11 falls within the standard length rang Std, and if a recognition result Rst is judged to be incorrect, the rib number of a rib judged as incorrect, measured length of the rib, standard length of the rib are displayed in the incorrect recognition result display/correction unit 14, thereby allowing the user to easily understand the contents of incorrect recognition result and to correct the recognition result of the rib judged as incorrectly recognized, so that the accuracy of final recognition results may be improved.

In the fourth embodiment described above, the standard range table 83a is formed as a table in which minimum and maximum values of ribs are registered. Alternatively, minimum and maximum values of the ratio of rib length to body height may be registered. In this case, it is only necessary for the anatomical measurement value obtaining unit 81 to obtain body height information of the subject by analyzing the accessory information of the image data Img processed by the image recognition unit 11, and to calculate the ratio of the length of each rib recognized by the image recognition unit 11 to the body height. Further, in this case, if the standard range table 83a defines the length range with respect to each rib as shown in FIG. 35B, the judging unit 84 judges whether or not the ratio of two ribs of those calculated by the anatomical measurement value obtaining unit 81 falls between the minimum and maximum values of the standard length ratios of the respective ribs. For example, if the length $Ms_1$ of the $1^{st}$ rib and the length $Ms_2$ of the $2^{nd}$ rib are calculated by the anatomical measurement value obtaining unit 81, the standard value obtaining means 82 obtains standard length range $Std_1$ (min) and $Std_1$ (max) of the $1^{st}$ rib, and standard length range $Std_2$ (min) and $Std_2$ (max) of the $2^{nd}$ rib, and the judging unit 84 judges whether or not the length ratio of the $1^{st}$ rib to the $2^{nd}$ rib $Ms_1/Ms_2$ satisfies $Std_1(min)/Std_2(max) \leq Ms_1/Ms_2 \leq Std_1(max)/Std_2(min)$.

Next, fifth and sixth embodiments of the present invention will be described focusing on the difference from the fourth, second, or third embodiment. These embodiments differ from the fourth embodiment only in the processing of the recognition result judging unit 12, and others are identical to those of the fourth embodiment.

In the fifth embodiment, it is assumed that the length of each rib follows a predetermined probability distribution, and a reliability level in the probability distribution is obtained, then a reliability range in the probability distribution is obtained based on the obtained reliability level, and judgment of recognition result is made with the reliability range as a predetermined length range.

Figure 36:
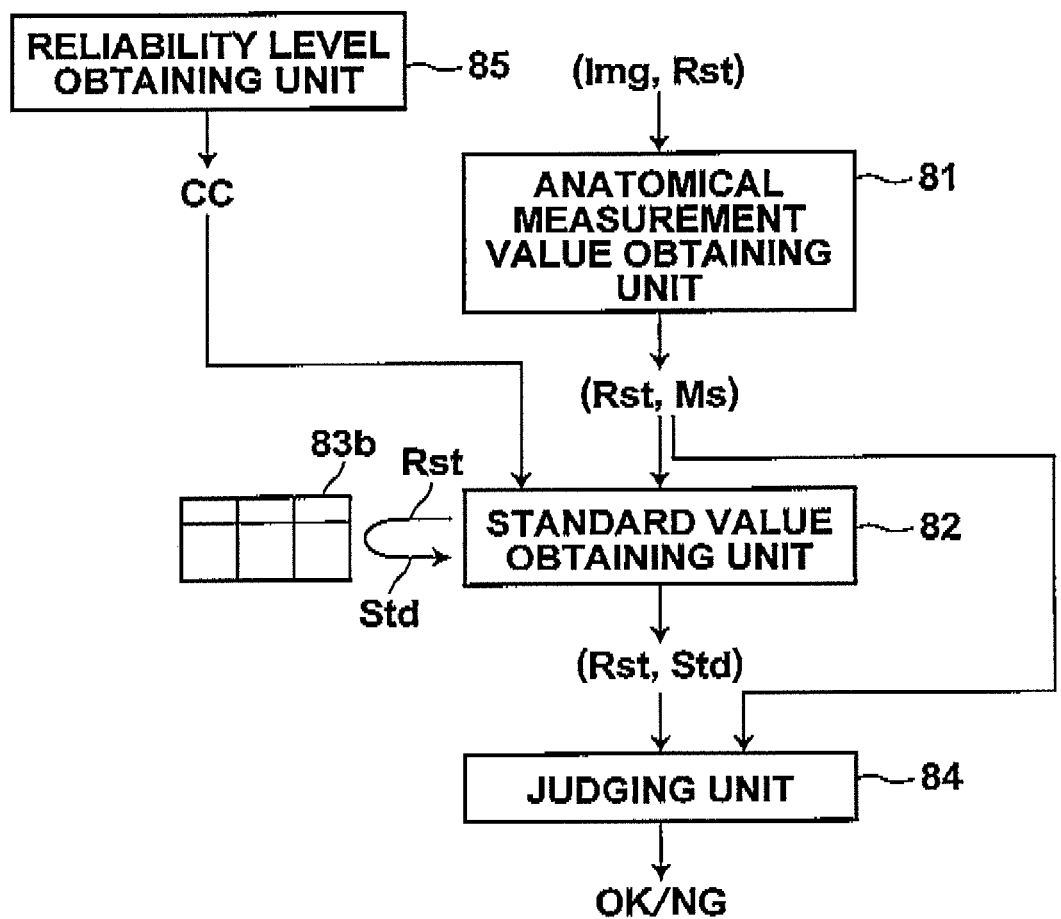
FIG. 36 is a block diagram of recognition result judging unit according to fifth and eighth embodiments of the present invention, schematically illustrating the configuration thereof.

FIG. 36 is a block diagram of the recognition result judging unit 12 according to the present embodiment, illustrating the processing thereof in detail. As illustrated, a reliability level obtaining unit 85 is added to the configuration of FIG. 34, and the processing of the standard value obtaining unit 82 is different. Further, the standard range table 83a is replaced with a standard range table 83b.

As in the reliability level obtaining unit 75 in the second embodiment, the reliability level obtaining unit 85 obtains a reliability level cc which is given as a parameter when the program that performs the processing is activated, by a user input, or otherwise by a certain calculation method.

FIGS. 37A and 37B show two examples of the standard range table 83b in the present embodiment. It is assumed here that a length distribution of ribs follows normal distribution, and in FIG. 37A an average length value $\mu_0$ and a standard deviation $\sigma_0$ of all ribs are defined, while in FIG. 37B an average length value $\mu_n$ and a standard deviation $\sigma_n$ with respect to each rib are defined (n=1, 2, - - - 12).

The standard value obtaining unit 82 obtains the average length value $\mu_0$ or $\mu_n$ and the standard deviation $\sigma_0$ or $\sigma_n$ of each rib from the standard range table 83b, as in the fourth embodiment, and as in the second embodiment, refers to reference data representing a normal distribution table with the reliability level cc obtained by the reliability level obtaining unit 85 as the reference key to obtain a standard score z corresponding to the reliability level cc, and calculates a reliability range, that is, the standard length range Std of the rib from the standard score z, and the average value $\mu_0$ or $\mu_n$ and standard deviation $\sigma_0$ or $\sigma_n$ obtained from the standard range table 83b as in Formulae (1) and (2) above.

Processing of other units is identical to that of the fourth embodiment.

As described above, in the fifth embodiment, it is assumed that the length of each rib follows a predetermined probability distribution, and in the recognition result judging unit 12, a reliability level cc in the normal probability distribution is obtained by the reliability level obtaining unit 85, then a reliability range in the probability distribution is obtained by the standard value obtaining unit 82 as the standard length range of each rib based on the reliability level cc obtained by the reliability level obtaining unit 85, and the average value and standard deviation obtained from the standard range table 83b, and judgment of the rib recognition result is made by the judging unit 84 using the reliability range. This allows the judgment standard to be set finely according to the reliability level, thereby more accurate rib recognition results may be obtained.

In the sixth embodiment of the present invention, attribute information representing an attribute of a subject is obtained, then a standard length range of each rib is determined according to the obtained attribute information, and judgment of recognition results is made using the determined standard length range.

Figures 38, 39, 40:
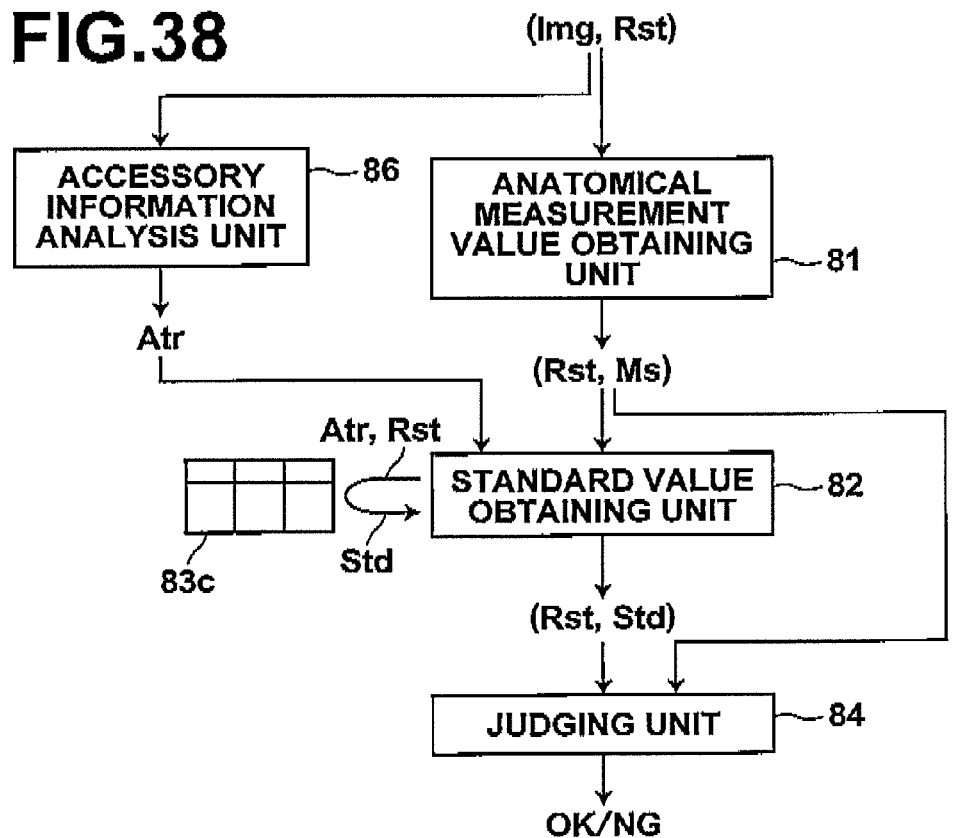
FIG. 38 is a block diagram of recognition result judging unit according to sixth and ninth embodiments of the present invention, schematically illustrating the configuration thereof.
FIG. 39 illustrates an example of normal range table according to the sixth and ninth embodiments.
FIG. 40 illustrates an example of normal range table according to a modification of the sixth and ninth embodiments.

FIG. 38 is a block diagram of the recognition result judging unit 12 according to the present embodiment, illustrating the processing thereof in detail. As illustrated, an accessory information analysis unit 86 is added to the configuration of FIG. 34, and the processing of the standard value obtaining unit 82 is different. Further, the standard range table 83a is replaced with a standard range table 83c.

The accessory information analysis unit 86 analyzes accessory information of inputted image data Img to obtain attribute information Atr. It is assumed here that the attribute information Atr represents a body height of a subject.

FIG. 39 shows an example of the standard range table 83c in the present embodiment. As illustrated, the standard range table 83c defines a standard length range common to all ribs with respect to each of three categories of body height ranges of subjects, from 140 to less than 160 cm, from 160 to less than 180 cm, and from 180 to less than 200 cm. It is noted that body height ranges not included in the three categories may also be defined. Further, the standard length ranges of ribs may be defined with respect to each body height range and each rib number.

The standard value obtaining unit 82 refers to the standard range table 83c with a body height Atr of a subject obtained by the accessory information analysis unit 86 as the search key and obtains a standard rib length range Std according to the body height Atr of the subject.

Processing of other units is identical to that of the fourth embodiment.

As described above, in the sixth embodiment, in the recognition result judging unit 12, attribute information Atr representing a body height of a subject is obtained by the accessory information analysis unit 86, then a standard length range Std of each rib is determined by the standard value obtaining unit 82 according to the body height Atr by referring to the standard range table 83c defining standard length range with respect to each body height range, and judgment of the rib recognition result is made by the judging unit 84 using the determined standard length range Std. This allows the judgment standard to be set finely according to the body height of a subject, thereby more accurate rib recognition results may be obtained.

In the embodiment described above, the standard range table 83*c* defines standard rib length ranges with respect to each body height range. But an arrangement may be adopted in which, as shown in FIG. 40, the standard range table 83*c* defines a standard length range ($Std_0$) common to all ribs only for a standard body height $Atr_0$ (170 cm in FIG. 40), then based on the ratio of the body height Atr of the subject obtained by the accessory information obtaining unit 86 and the standard body height $Atr_0$, the standard value obtaining unit 82 converts the standard rib length range $Std_0$ of the standard body height $Atr_0$ as in Formulae (3) and (4) above, thereby obtaining the standard rib length range Std of the subject.

Further, in the embodiment described above, the standard rib length range is obtained according to the body height of a subject. But, as in the modification of the third embodiment, the standard length range may be defined with respect to each attribute of a subject, such as gender or the like, or each combination of attributes.

Still further, the attribute information may be obtained by the accessory information obtaining unit 86 from accessory information as described above, by performing a known image analysis processing on input image data Img (to obtain, for example, area of a human body), or through a user input.

The standard range table may be formed to include a combination of those of the embodiments described above. For example, the standard range table may define the average value of rib length, and standard variation shown in FIG. 37A or 37B with respect to each body height range like that shown in FIG. 39.

Further, an arrangement may be adopted in which a standard rib length is obtained by a function which outputs a standard rib length when a body height or the like of a subject is inputted, instead of using the reference table.

Still further, as a measure of judgment for rib recognition results by the image recognition unit 11, that is, as an anatomical measurement value obtained by the anatomical measurement value obtaining unit 81, those other than the rib length may be used. Specific examples include a curving state (curvatures) of a rib, a direction of a normal vector to a plane where a rib is present, a distance between ribs, and a distance of a rib from a reference position of a subject.

4. Implementation Example of Vertebral Body Recognition Processing

Embodiments 7 to 9

Hereinafter, where vertebral body recognition processing is performed by the system described above will be described as embodiments 7 to 9.

In the embodiments, vertebral body recognition processing is implemented in the image recognition unit 11 shown in FIG. 2, which receives image data Img of a three-dimensional image obtained by the modality 1, such as CT, MRI or the like, recognizes each vertebral body of a subject in the image, and outputs information of recognized vertebral body areas as vertebral body recognition results Rst. In certain embodiments, recognition of vertebral body number of each recognized vertebral body is also performed.

Hereinafter, embodiments in which processing of determining vertebral body numbers is added to the image recognition unit 11 described under Paragraph 3 above will be described by referring to the method proposed by the applicant of the present invention in Japanese Patent Application No. 2008-092173. Where judgment of recognition results with respect to each vertebral body number is not performed, then vertebral body areas may be recognized by only performing the processing of the vertebral bone area extraction means 94 (vertebral bone position determination means 100) described under Paragraph 3 above.

Figure 41:
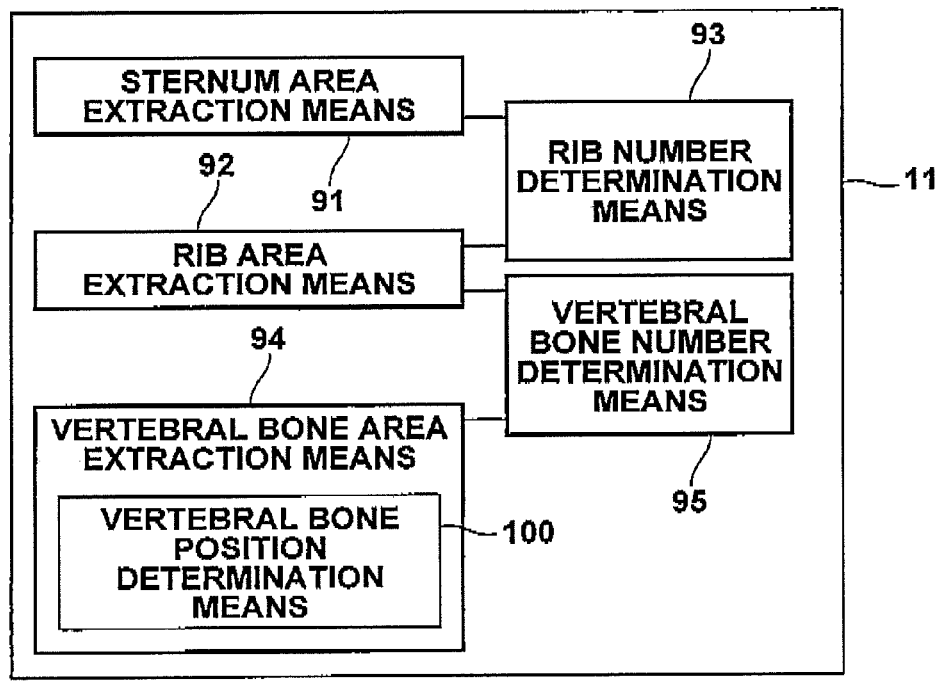
FIG. 41 is a block diagram of an image recognition unit that performs recognition of a vertebral bone and vertebral body number

FIG. 41 is a block diagram of the image recognition unit 11 for performing the vertebral body area and vertebral body number recognition, illustrating the configuration thereof. It basically the same as the block diagram shown in FIG. 21 with a vertebral bone number determination means 95 added thereto. Accordingly, the processing of the sternum area extraction means 91, rib area extraction means 92, rib number determination means 93, and vertebral bone area extraction means 94 (vertebral bone position determination means 100) is identical to that described under Paragraph 3 above.

The vertebral bone number determination means 95 determines a vertebral body number based on a rib number of rib area and how the rib area is connected to the vertebral bone area.

Figure 42:
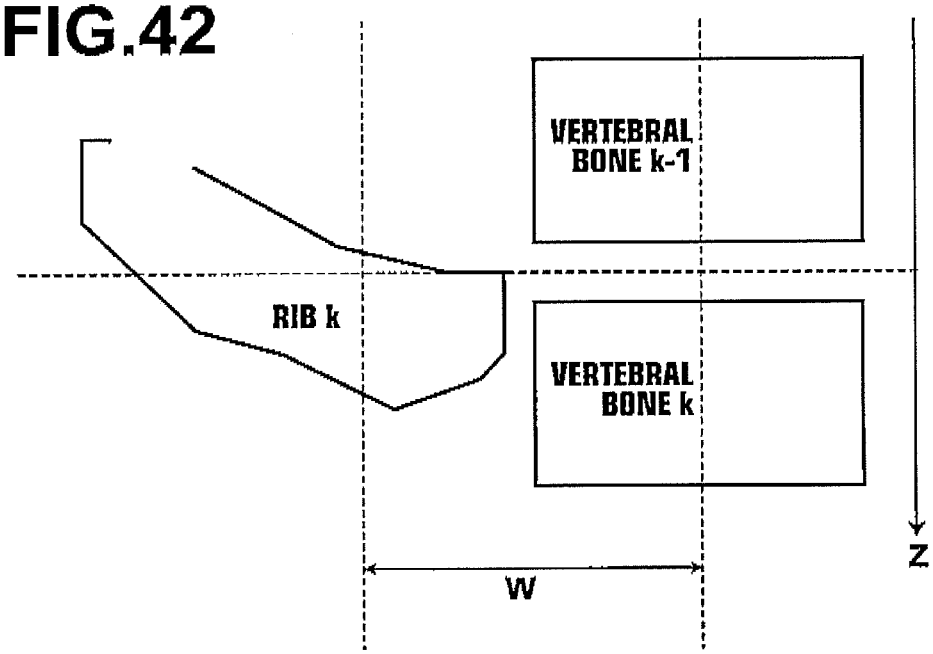
FIG. 42 illustrates connection relation between vertebral bone and rib.

The following method may be used as one of the methods for determining to which vertebral bone a rib area is connected. That is, a method in which a creation width W from the center line of vertebral bone areas is determined (e.g., the width of vertebral bone may be used as W) as illustrated in FIG. 42, and a rib area having rib number k within the range is projected on the z axis to obtain a range where the rib area appears in the z direction. Likewise, vertebral bone areas are projected on the z axis to obtain a range of each vertebral bone area on the z axis. The rib area having rib number k which overlaps largest with the range of a vertebral bone area is judged as the vertebral bone connected to the vertebral bone area, and the vertebral body number of the vertebral bone area is determined as k.

Figure 33:
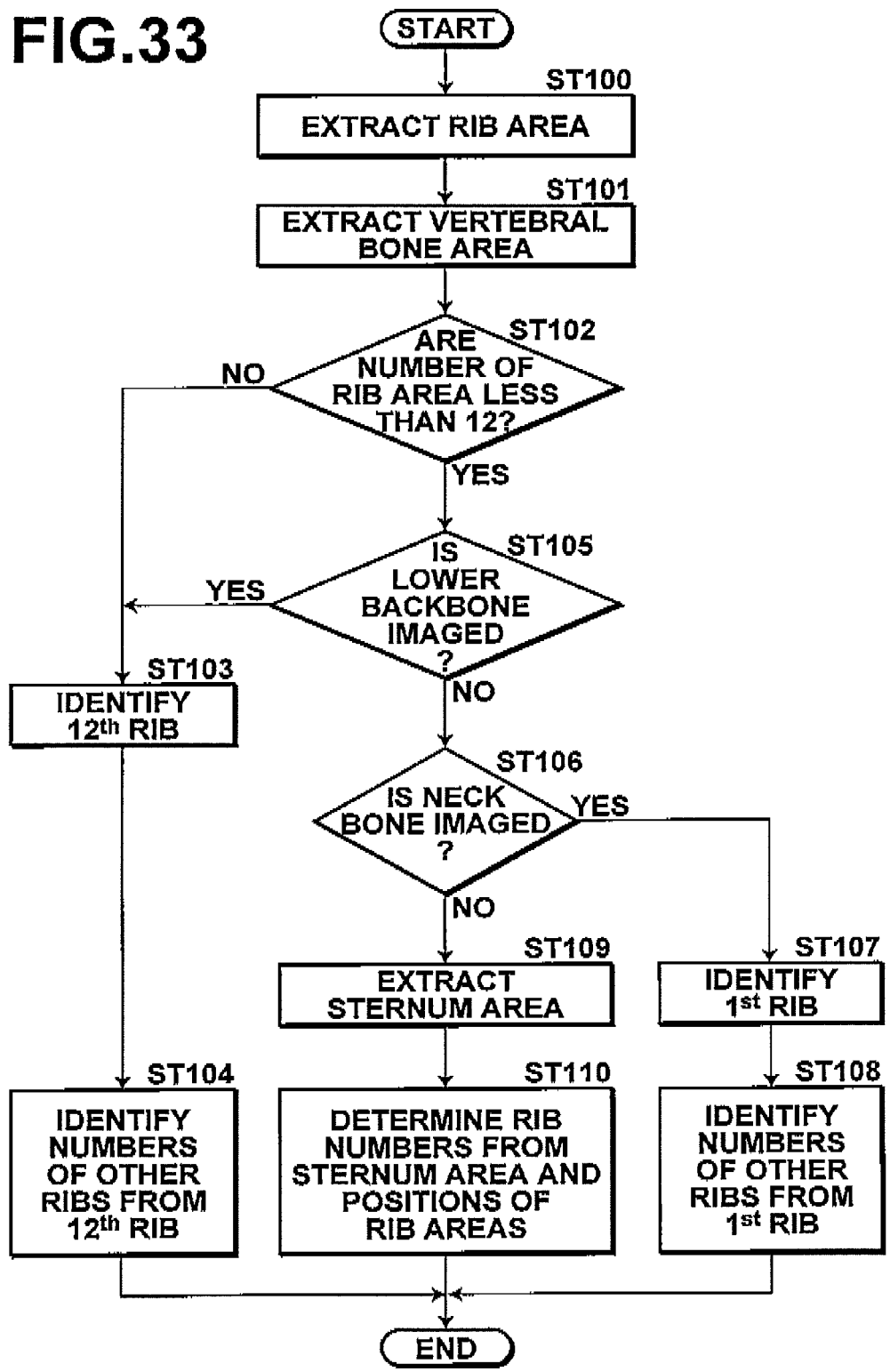
FIG. 33 is a flowchart illustrating a processing flow of recognizing rib and rib number.

Accordingly, in the flowchart of FIG. 33, after the processing of identifying a rib number (ST 104, 108, 110), the vertebral bone number of each vertebral bone area is determined by the vertebral bone number determination means 95 based on the rib number and how the rib area is connected to the vertebral bone area.

As the seventh embodiment of the present invention, it is conceivable that judgment/correction of vertebral body recognition results is realized by configuring the recognition result judging unit 12 shown in FIG. 2 identical to that of the fourth embodiment of the present invention shown in FIG. 34. Here, the anatomical measurement value obtaining unit 81 measures a length of vertebral bone center line passing through each vertebral body recognized by the image recognition unit 11, which is determined as the height of each vertebral body. The standard range table 83*a* defines a standard height range common to all vertebral bodies by minimum and maximum values as in FIG. 35A. The standard value obtaining unit 82 obtains the minimum and maximum values as the standard vertebral body height range Std for all vertebral bodies recognized by the image recognition unit 11. Alternatively, an arrangement may be adopted in which the standard range table 83*a* defines minimum and maximum values of standard height range for each vertebral body having each vertebral body number as in FIG. 35B, and the standard value obtaining unit 82 refers to the standard range table 83*a* with each vertebral body number of each vertebral body recognized by the image recognition unit 11 as the search key and obtains the minimum and maximum values corresponding to the vertebral body number as the standard height range Std of the vertebral body having the vertebral body number. The judging unit 84 judges whether or not the height Ms of each vertebral body obtained by the anatomical measurement value obtaining unit 81 falls within the standard vertebral body height range Std (common to all vertebral bodies or standard height range with respect to each vertebral body number) and outputs each result (OK/NG) as in the fourth embodiment. Likewise, when a height of at least one of the vertebral bodies is determined to be outside of the standard height range (NG) as a result of judgment made by the judging unit 84 of the recognition result judging unit 12, the incorrect recognition result display/correction unit 14, for example, with the processing target image data Img and incorrect recognition results as input, reconstructs an image including the vertebral body judged to be outside of the standard height range based, for example, on the processing target image data Img, displays the vertebral body in an identifiable manner in addition to the vertebral body number of the vertebral body, measured height, standard height range of the vertebral body in a manner like "The first thoracic vertebra is outside of the standard value range (XX to YY). The measured height=ZZ mm", provides a user interface for accepting correction of the contour of the vertebral body by the user through a mouse operation on the reconstructed image, and outputs the corrected recognition results Rst' as in the fourth embodiment. Further, a list of image data Img judged as vertebral body recognition error may be displayed and the user interface may be provided after accepting selection of intended image data by the user. The database registration unit 15 registers the processing target image data Img in the image information database 4 with the recognition results Rst recognized by the image recognition unit 11 or corrected recognition results Rst' attached as accessory information, as described under Paragraph 1 above.

As describe above, in the seventh embodiment, it is possible that the recognition result judging unit 12 automatically judges whether or not the height Ms of each vertebral body recognized by the vertebral body recognition processing of the image recognition unit 11 falls within the standard height range Std, and if a recognition result Rst is judged to be incorrect, the number of a vertebral body judged as incorrect, measured height of the vertebral body, and standard height range of the vertebral body having the vertebral body number are displayed in the incorrect recognition result display/correction unit 14, thereby allowing the user to easily understand the contents of incorrect recognition result and to correct the recognition result of the vertebral body judged as incorrectly recognized, so that the accuracy of final recognition results may be improved.

In the seventh embodiment described above, the standard range table 83*a* is formed as a table in which minimum and maximum values of standard vertebral body height are registered. Alternatively, minimum and maximum values of the ratio of vertebral body height to body height may be registered. In this case, it is only necessary for the anatomical measurement value obtaining unit 81 to obtain body height information of the subject by analyzing the accessory information of the image data Img processed by the image recognition unit 11, and to calculate the ratio of the height of each vertebral body recognized by the image recognition unit 11 to the body height. Further, in this case, if the standard range table 83*a* defines the height range with respect to each vertebral body number as shown in FIG. 35B, the judging unit 84 judges whether or not the ratio of two vertebral bodies of those calculated by the anatomical measurement value obtaining unit 81 falls between the minimum and maximum values of the standard length ratios of the respective vertebral bodies. For example, if the height $Ms_1$ of the $1^{st}$ thoracic vertebra and the height $Ms_2$ of the $2^{nd}$ thoracic vertebra are obtained by the anatomical measurement value obtaining unit 81, the standard value obtaining means 82 obtains standard height range $Std_1$ (min) and $Std_1$ (max) of the $1^{st}$ thoracic vertebra, and standard height range $Std_2$ (min) and $Std_2$ (max) of the $2^{nd}$ thoracic vertebra, and the judging unit 84 judges whether or not the height ratio of the $1^{st}$ thoracic vertebra to the $2^{nd}$ thoracic vertebra $Ms_1/Ms_2$ satisfies $Std_1$ (min)/$Std_2$ (max)$\leq Ms_1/Ms_2 \leq Std_1$(max)/$Std_2$ (min).

Next, eighth and ninth embodiments of the present invention will be described focusing on the difference from the seventh, fifth, or sixth embodiment. These embodiments differ from the seventh embodiment only in the processing of the recognition result judging unit 12, and others are identical to those of the seventh embodiment.

In the eighth embodiment, the recognition result judging unit 12 shown in FIG. 2 is configured identical to that of the fifth embodiment of the present invention shown in FIG. 36. In the eighth embodiment, it is assumed that the height of each vertebral body follows a predetermined probability distribution (normal distribution, here), and a reliability level in the probability distribution is obtained, then a reliability range in the probability distribution is obtained based on the obtained reliability level, and judgment of recognition result is made with the reliability range as a predetermined height range. As shown in FIG. 36, the reliability level obtaining unit 85 is configured to obtain a reliability level cc as in the fifth embodiment, and the standard range table 83*b* defines an average height value $\mu_0$ and a standard deviation $\sigma_0$ of all vertebral bodies as in FIG. 37A, or an average height value $\mu_m$ and a standard deviation $\sigma_m$ with respect to each vertebral body number (m is a subscript for identifying each vertebral body). Then, the standard value obtaining unit 82 obtains the height length value $\mu_0$ or $\mu_m$ and the standard deviation $\sigma_0$ or $\sigma_m$ of each vertebral body from the standard range table 83*b*, and refers to reference data representing a normal distribution table with the reliability level cc obtained by the reliability level obtaining unit 85 as the reference key to obtain a standard score z corresponding to the reliability level cc, and calculates a reliability range, that is, the standard height range Std of the vertebral body from the standard score z, and the average value $\mu_0$ or $\mu_m$ and standard deviation $\sigma_0$ or $\sigma_m$ obtained from the standard range table 83*b* as in Formulae (1) and (2) above. Processing of other units is identical to that of the seventh embodiment.

As described above, in the eighth embodiment, it is assumed that the height of each vertebral body follows normal distribution, and, in the recognition result judging unit 12, a reliability level cc in the normal distribution is obtained by the reliability level obtaining unit 85, then a reliability range in the probability distribution is obtained by the standard value obtaining unit 82 as the standard height range of each vertebral body based on the reliability level cc obtained by the reliability level obtaining unit 85, and the average value and standard deviation obtained from the standard range table 83*b*, and judgment of the vertebral body recognition result is made by the judging unit 84 using the reliability range. This allows the judgment standard to be set finely according to the reliability level, thereby more accurate rib recognition results may be obtained.

In the ninth embodiment, the recognition result judging unit 12 shown in FIG. 2 is configured identical to that of the sixth embodiment of the present invention shown in FIG. 38. Thus, in the ninth embodiment, attribute information representing an attribute of a subject is obtained, then a standard height range of each vertebral body is determined according to the obtained attribute information, and judgment of vertebral recognition results is made using the determined standard height range. As illustrated in FIG. 38, the accessory information analysis unit 86 analyzes accessory information of inputted image data Img to obtain attribute information (body height, here) Atr. The standard range table 83c defines a standard height range common to all vertebral bodies with respect to each of three categories of body height ranges of subjects, from 140 to less than 160 cm, from 160 to less than 180 cm, and from 180 to less than 200 cm as illustrated in FIG. 39 (the standard vertebral body height ranges may be defined with respect to each body height range and each vertebral body number). The standard value obtaining unit 82 refers to the standard range table 83c with a body height Atr of a subject obtained by the accessory information analysis unit 86 as the search key and obtains a standard vertebral body height range according to the body height Atr of the subject. Processing of other units is identical to that of the seventh embodiment.

As described above, in the ninth embodiment, in the recognition result judging unit 12, attribute information Atr representing a body height of a subject is obtained by the accessory information analysis unit 86, then a standard height range Std of each vertebral body is determined by the standard value obtaining unit 82 according to the body height Atr by referring to the standard range table 83c defining standard height range with respect to each body height range, and judgment of the vertebral body recognition result is made by the judging unit 84 using the determined standard height range Std. This allows the judgment standard to be set finely according to the body height of a subject, thereby more accurate vertebral body recognition results may be obtained.

In the embodiment described above, the standard range table 83c defines standard vertebral body height ranges with respect to each body height range. But an arrangement may be adopted in which, as shown in FIG. 40, the standard range table 83c defines a standard height range ($Std_0$) common to all vertebral bodies only for a standard body height $Atr_0$ (170 cm in FIG. 40), then based on the ratio of the body height Atr of the subject obtained by the accessory information obtaining unit 86 and the standard body height $Atr_0$, the standard value obtaining unit 82 converts the standard vertebral body height range $Std_0$ of the standard body height $Atr_0$ as in Formulae (3) and (4) above, thereby obtaining the standard vertebral body height range Std of the subject.

Further, in the embodiment described above, the standard vertebral body height range is obtained according to the body height of a subject. But, as in the modification of the third embodiment, the standard height range may be defined with respect to each attribute of a subject, such as gender or the like, or each combination of attributes.

Still further, the attribute information may be obtained by the accessory information obtaining unit 86 from accessory information as described above, by performing a known image analysis processing on input image data Img (to obtain, for example, area of a human body), or through a user input.

The standard range table may be formed to include a combination of those of the embodiments described above. For example, the standard range table may define the average value of vertebral body height and standard variation shown in FIG. 37A or 37B with respect to each body height range like that shown in FIG. 39.

Further, an arrangement may be adopted in which a standard vertebral body height is obtained by a function which outputs a standard vertebral body height when a body height or the like of a subject is inputted, instead of using the reference table.

Still further, as a measure of judgment for vertebral body recognition results by the image recognition unit 11, that is, as an anatomical measurement value obtained by the anatomical measurement value obtaining unit 81, those other than the vertebral body height may be used. Specific examples include a width of a vertebral body, a distance between vertebral bodies, and a distance of a vertebral body from a reference position of a subject.

So far, the basic configuration and processing flow of a system according to an embodiment of the present invention, and nine embodiments as specific implementation examples of image recognition processing have been described. It should be appreciated that various changes and modifications made to the system configurations, table formats, processing flows, user interfaces, and the like of the embodiments described above without departing from the scope of the invention are all included in the technical scope of the present invention. The embodiments described above are for illustration purposes only, and should not in anyway be construed as limiting the technical scope of the present invention.

For example, as for the system configuration, the image recognition unit 11 and recognition result judging unit 12 may be implemented in the recognition result correction terminal 5, instead of in the image information management server 3. Further, instead of using the recognition result correction terminal 5, a configuration may be adopted in which a quality management workstation (QA-WS) used for performing normalization processing (EDR processing) and quality control on an image received from the modality 1, allowing medical technologists to perform image quality inspection, and the like is connected to the network 19, the recognition result judging (correction) apparatus is implemented in the quality management workstation, image information after the recognition results are finalized is transmitted to the image information management server 3, and the image information is registered in the image information database 4 by the image information management server 3. Further, the processing performed in the recognition result correction terminal 5 may be implemented in the radiological workstation 2 (2a, 2b).

Further, the present invention may be used for judging or correcting image recognition processing results with respect to structures other than imaged regions, ribs, and vertebral bodies. Examples of anatomical measurement values used for the recognition and judgment are listed below.

(a) Volume, major axis, minor axis, shape (circularity, sphericity, average contour curvature), and positional relation of an organ in organ recognition. Specific examples of positional relation include a case in which a protruding distance of lung apex from the upper edge of collarbone is measured as the anatomical measurement value and the standard protruding distance range is defined from 2 to 3 cm, or a case in which vertebral body numbers corresponding to the upper and lower ends of kidney are measured as the anatomical measurement values and the upper and lower ends of normal kidney location are defined as positions corresponding to positions of the $12^{th}$ and $4^{th}$ thoracic vertebrae respectively.

(b) Structure size in tubular structure (blood vessel, trachea, or the like) recognition.

(c) Structure thickness in membrane structure or planar structure recognition.

(d) Angle with median in bronchial tube recognition.

(e) Volume within a cranium in cranium bone recognition.

(f) Movable range and movable direction of each joint in bone recognition.

Further, in each of the embodiments described above, correction of image recognition results is manually performed by the user. But correction of image recognition results may be performed by changing the processing parameter of image recognition processing in each of the embodiments according to the incorrect recognition result, and performing the image recognition processing again under the changed processing parameter.

What is claimed is:

1. An image recognition result judging apparatus, comprising:
   an image recognition means, implemented by a processor, that recognizes a predetermined structure in an image representing a subject;
   a structure measuring means that measures the predetermined structure on the image recognized by the image recognition means to obtain a predetermined anatomical measurement value of the predetermined structure; and
   a recognition result judging means that judges whether or not the anatomical measurement value falls within a predetermined standard range,
   wherein:
   the image recognition means is a means that, based on a characteristic of content of each of a plurality of tomographic images representing a plurality of regions of the subject and a relationship of the characteristic of content between each of the tomographic images, determines a region of the subject represented by each of the tomographic images so as to match with an anatomical positional relationship of each of the regions of the subject;
   the structure measuring means is a means that calculates a length of the determined region in a direction perpendicular to the tomographic planes of the tomographic images; and
   the recognition result judging means is a means that judges whether or not the calculated length falls within a predetermined standard length range.

2. The image recognition result judging apparatus according to claim 1, wherein the predetermined structure is a normal structure of the subject.

3. The image recognition result judging apparatus according to claim 1, wherein the image recognition means is a means that performs the recognition using a discriminator obtained by machine learning.

4. The image recognition result judging apparatus according to claim 1, wherein the anatomical measurement value represents at least one of the length, area, volume, shape, orientation, and positional relationship of the predetermined structure recognized by the image recognition means.

5. The image recognition result judging apparatus according to claim 1, wherein:
   the apparatus further comprises a standard range storage means storing information that identifies the predetermined standard range; and
   the recognition result judging means is a means that obtains the standard range from the standard range storage means and makes the judgment using the obtained standard range.

6. The image recognition result judging apparatus according to claim 1, wherein:
   the anatomical measurement value is assumed to follow a predetermined probability distribution;
   the apparatus further comprises a reliability level obtaining means that obtains a reliability level in the probability distribution; and
   the recognition result judging means is a means that obtains a reliability range in the probability distribution based on the obtained reliability level and makes the judgment with the reliability range as the standard range.

7. The image recognition result judging apparatus according to claim 1, wherein:
   the apparatus further comprises an attribute information obtaining means that obtains attribute information representing an attribute of the subject; and
   the recognition result judging means is a means that determines the standard range according to the obtained attribute information and makes the judgment using the determined standard range.

8. The image recognition result judging apparatus according to claim 1, further comprising an incorrect recognition result output means that provides an output indicating that the recognition result of the image recognition means is incorrect when the anatomical measurement value is judged to be outside of the standard range as a result of the judgment of the recognition result judging means.

9. The image recognition result judging apparatus according to claim 8, wherein the incorrect recognition result output means is a means that outputs the anatomical measurement value judged to be outside of the standard range.

10. The image recognition result judging apparatus according to claim 9, wherein the incorrect recognition result output means is a means that outputs the standard range used in the judgment.

11. The image recognition result judging apparatus according to claim 1, further comprising a recognition result correction means that corrects the recognition result of the image recognition means when the anatomical measurement value is judged to be outside of the standard range as a result of the judgment of the recognition result judging means.

12. The image recognition result judging apparatus according to claim 11, wherein the recognition result correction means is a means that causes the image recognition means to re-perform the recognition of the predetermined structure by changing at least one of the processing conditions thereof.

13. The image recognition result judging apparatus according to claim 1, wherein the image recognition means includes:
   a region provisional recognition means that provisionally recognizes a region of the subject represented by each of the plurality of tomographic images based on the characteristic of content of each of the tomographic images; and
   a region determination means that determines the region represented by each of the tomographic images by correcting the provisionally recognized region in each of the tomographic images such that a positional relationship between the provisionally recognized regions of the respective tomographic images matches with the anatomical positional relationship of the subject.

14. The image recognition result judging apparatus according to claim 1, wherein
   the subject is a human body; and
   the plurality of tomographic images is axial section images, and includes two or more of head, neck, chest, abdomen, leg, and a composite region including two adjacent ones thereof.

15. The image recognition result judging apparatus according to claim 1, wherein the recognition result judging means is a means that makes the judgment using a ratio of the lengths of two of the regions determined by the image recognition means.

16. The image recognition result judging apparatus according to claim 1, wherein the predetermined structure is at least either one of a rib or a vertebral body.

17. An image recognition result judging method comprising the steps of:
   recognizing a predetermined structure in an image representing a subject;

measuring the recognized predetermined structure on the image to obtain a predetermined anatomical measurement value of the predetermined structure; and judging whether or not the anatomical measurement value falls within a predetermined standard range, wherein:

the recognizing comprises recognizing, based on a characteristic of content of each of a plurality of tomographic images representing a plurality of regions of the subject and a relationship of the characteristic of content between each of the tomographic images, determining a region of the subject represented by each of the tomographic images so as to match with an anatomical positional relationship of each of the regions of the subject;

the measuring comprises calculating a length of the determined region in a direction perpendicular to the tomographic planes of the tomographic images; and the judging comprises judging whether or not the calculated length falls within a predetermined standard length range.

18. A non-transitory computer readable recording medium having an image recognition result judging program recorded therein for causing a computer to perform the steps of:

recognizing a predetermined structure in an image representing a subject;

measuring the recognized predetermined structure on the image to obtain a predetermined anatomical measurement Value of the predetermined structure; and judging whether or not the anatomical measurement value falls within a predetermined standard range, wherein:

the recognizing comprises recognizing, based on a characteristic of content of each of a plurality of tomographic images representing a plurality of regions of the subject and a relationship of the characteristic of content between each of the tomographic images, determining a region of the subject represented by each of the tomographic images so as to match with an anatomical positional relationship of each of the regions of the subject;

the measuring comprises calculating a length of the determined region in a direction perpendicular to the tomographic planes of the tomographic images; and the judging comprises judging whether or not the calculated length falls within a predetermined standard length range.

* * * * *